United States Patent
Bose et al.

(10) Patent No.: US 6,215,822 B1
(45) Date of Patent: Apr. 10, 2001

(54) MOTION COMPENSATED DIGITAL VIDEO DECODING AND BUFFER MEMORY ADDRESSING THEREFOR

(75) Inventors: Subroto Bose, Santa Clara; Shirish C. Gadre, San Jose; Taner Ozcelik, Palo Alto; Syed Reza, Santa Clara, all of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/001,122

(22) Filed: Dec. 30, 1997

(51) Int. Cl.$^7$ ................................ H04B 1/66; H04N 7/12

(52) U.S. Cl. ................................................ 375/240.16

(58) Field of Search ........................... 348/410.1, 411.1, 348/412.1, 413.1, 414.1, 415.1, 416.1, 699.1, 700, 709, 710, 713, 714, 715, 716, 717, 718, 719, 419; 375/240, 240.16, 240.13; H04N 7/12; H04B 1/66

(56) References Cited

U.S. PATENT DOCUMENTS

| | | | |
|---|---|---|---|
| 5,384,581 | * 1/1995 | Ikeda | 345/186 |
| 5,598,283 | * 1/1997 | Percell et al. | 382/232 |
| 5,675,331 | * 10/1997 | Watamabe et al. | 341/67 |
| 5,675,387 | * 10/1997 | Hoogenboom | 348/416 |
| 5,729,303 | * 3/1998 | Oku et al. | 348/716 |
| 5,812,791 | * 12/1998 | Wasserman et al. | 395/200 |

FOREIGN PATENT DOCUMENTS

| | | |
|---|---|---|
| 44 41 295 | 5/1996 | (DE) . |
| 0 503 956 | 9/1992 | (EP) . |
| 0 697 794 | 2/1996 | (EP) . |
| 0 849 953 | 6/1998 | (EP) . |

OTHER PUBLICATIONS

Winzker et al., *Architecture and Memory Requirements for Stand–Alone and Hierarchical MPEG 2 HDTV–Decoders with Synchronous DRAMs.*, 1995 IEEE International Symposium on Circuits and Systems (ISCAS), Seattle, vol. 1, Apr. 30, 1995, pp. 609–612.

* cited by examiner

Primary Examiner—Chris S. Kelley
Assistant Examiner—Tung Vo
(74) Attorney, Agent, or Firm—Wood, Herron & Evans, L.L.P.

(57) ABSTRACT

A digital video presentation system is provided with hardware and software logic for mapping the picture data into buffer memory in a way that permits both the reading of motion vector compensated macroblocks of data and the reading of horizontal picture wide scan lines with a low number of memory page crossings. Preferably, the memory is a plurality of rows, for example 16 rows, wide. Preferably, 16 lines of 8-pixel (two 32 pixel wide column) line segments of 8×8 pixel blocks are stored in consecutive storage locations followed by the consecutive storage vertically adjacent line segments until one line segment is stored in each logical row of the memory. Then the next horizontally adjacent set of line segments of similarly stored until the right boundary of the picture is reached, then the each additional row of 16 lines of the picture similarly are stored until the bottom of the picture is reached. Each 16×16 pixel macroblock of data is stored on a single page; preferably, two horizontally adjacent macroblocks are stored on one page of memory. Each line of the picture is stored in contiguous locations on the same row of the memory. The motion compensation logic interprets motion vectors from the incoming data and calculates addresses for a macroblock of picture data by separating read commands into separate commands where a page boundary divides the macroblock into vertically adjacent rectangles. Memory controller logic further divides such rectangles where they cross boundaries between horizontally adjacent pages of the memory. One fixed address increment of 8 hex steps from line segment to vertically adjacent line segment while another fixed address increment of 80 hex steps horizontally from one 8 pixel line segment to the next, such as across a scan line of the picture.

5 Claims, 19 Drawing Sheets

FIG. 3

| $Y_{0,0}$ | $Y_{0,1}$ | $Y_{0,2}$ | $Y_{0,3}$ | $Y_{0,4}$ | $Y_{0,5}$ | $Y_{0,6}$ | $Y_{0,7}$ |
|---|---|---|---|---|---|---|---|
| $C_{0,0}$ | | $C_{0,2}$ | | $C_{0,4}$ | | $C_{0,6}$ | |
| $Y_{1,0}$ | $Y_{1,1}$ | $Y_{1,2}$ | $Y_{1,3}$ | $Y_{1,4}$ | $Y_{1,5}$ | $Y_{1,6}$ | $Y_{1,7}$ |
| $Y_{2,0}$ | $Y_{2,1}$ | $Y_{2,2}$ | $Y_{2,3}$ | $Y_{2,4}$ | $Y_{2,5}$ | $Y_{2,6}$ | $Y_{2,7}$ |
| $C_{2,0}$ | | $C_{2,2}$ | | $C_{2,4}$ | | $C_{2,6}$ | |
| $Y_{3,0}$ | $Y_{3,1}$ | $Y_{3,2}$ | $Y_{3,3}$ | $Y_{3,4}$ | $Y_{3,5}$ | $Y_{3,6}$ | $Y_{3,7}$ |
| $Y_{4,0}$ | $Y_{4,1}$ | $Y_{4,2}$ | $Y_{4,3}$ | $Y_{4,4}$ | $Y_{4,5}$ | $Y_{4,6}$ | $Y_{4,7}$ |
| $C_{4,0}$ | | $C_{4,2}$ | | $C_{4,4}$ | | $C_{4,6}$ | |
| $Y_{5,0}$ | $Y_{5,1}$ | $Y_{5,2}$ | $Y_{5,3}$ | $Y_{5,4}$ | $Y_{5,5}$ | $Y_{5,6}$ | $Y_{5,7}$ |
| $Y_{6,0}$ | $Y_{6,1}$ | $Y_{6,2}$ | $Y_{6,3}$ | $Y_{6,4}$ | $Y_{6,5}$ | $Y_{6,6}$ | $Y_{6,7}$ |
| $C_{6,0}$ | | $C_{6,2}$ | | $C_{6,4}$ | | $C_{6,6}$ | |
| $Y_{7,0}$ | $Y_{7,1}$ | $Y_{7,2}$ | $Y_{7,3}$ | $Y_{7,4}$ | $Y_{7,5}$ | $Y_{7,6}$ | $Y_{7,7}$ |

FIG. 4

ODD FIELD

| $Y_{0,0}$ | $Y_{0,1}$ | $Y_{0,2}$ | $Y_{0,3}$ | $Y_{0,4}$ | $Y_{0,5}$ | $Y_{0,6}$ | $Y_{0,7}$ |
|---|---|---|---|---|---|---|---|
| $C_{0,0}$ | | $C_{0,2}$ | | $C_{0,4}$ | | $C_{0,6}$ | |
| $Y_{2,0}$ | $Y_{2,1}$ | $Y_{2,2}$ | $Y_{2,3}$ | $Y_{2,4}$ | $Y_{2,5}$ | $Y_{2,6}$ | $Y_{2,7}$ |
| $Y_{4,0}$ | $Y_{4,1}$ | $Y_{4,2}$ | $Y_{4,3}$ | $Y_{4,4}$ | $Y_{4,5}$ | $Y_{4,6}$ | $Y_{4,7}$ |
| $C_{4,0}$ | | $C_{4,2}$ | | $C_{4,4}$ | | $C_{4,6}$ | |
| $Y_{6,0}$ | $Y_{6,1}$ | $Y_{6,2}$ | $Y_{6,3}$ | $Y_{6,4}$ | $Y_{6,5}$ | $Y_{6,6}$ | $Y_{6,7}$ |

EVEN FIELD

| $Y_{1,0}$ | $Y_{1,1}$ | $Y_{1,2}$ | $Y_{1,3}$ | $Y_{1,4}$ | $Y_{1,5}$ | $Y_{1,6}$ | $Y_{1,7}$ |
|---|---|---|---|---|---|---|---|
| $C_{2,0}$ | | $C_{2,2}$ | | $C_{2,4}$ | | $C_{2,6}$ | |
| $Y_{3,0}$ | $Y_{3,1}$ | $Y_{3,2}$ | $Y_{3,3}$ | $Y_{3,4}$ | $Y_{3,5}$ | $Y_{3,6}$ | $Y_{3,7}$ |
| $Y_{5,0}$ | $Y_{5,1}$ | $Y_{5,2}$ | $Y_{5,3}$ | $Y_{5,4}$ | $Y_{5,5}$ | $Y_{5,6}$ | $Y_{5,7}$ |
| $C_{6,0}$ | | $C_{6,2}$ | | $C_{6,4}$ | | $C_{6,6}$ | |
| $Y_{7,0}$ | $Y_{7,1}$ | $Y_{7,2}$ | $Y_{7,3}$ | $Y_{7,4}$ | $Y_{7,5}$ | $Y_{7,6}$ | $Y_{7,7}$ |

| $Y_{0,0}$ $Y_{0,1}$ $C_{0,0}$ | $Y_{0,2}$ $Y_{0,3}$ $C_{0,2}$ | $Y_{0,4}$ $Y_{0,5}$ $C_{0,4}$ | $Y_{0,6}$ $Y_{0,7}$ $C_{0,6}$ |
|---|---|---|---|
| $Y_{1,0}$ $Y_{1,1}$ $C_{1,0}$ | $Y_{1,2}$ $Y_{1,3}$ $C_{1,2}$ | $Y_{1,4}$ $Y_{1,5}$ $C_{1,4}$ | $Y_{1,6}$ $Y_{1,7}$ $C_{1,6}$ |
| $Y_{2,0}$ $Y_{2,1}$ $C_{2,0}$ | $Y_{2,2}$ $Y_{2,3}$ $C_{2,2}$ | $Y_{2,4}$ $Y_{2,5}$ $C_{2,4}$ | $Y_{2,6}$ $Y_{2,7}$ $C_{2,6}$ |
| $Y_{3,0}$ $Y_{3,1}$ $C_{3,0}$ | $Y_{3,2}$ $Y_{3,3}$ $C_{3,2}$ | $Y_{3,4}$ $Y_{3,5}$ $C_{3,4}$ | $Y_{3,6}$ $Y_{3,7}$ $C_{3,6}$ |
| $Y_{4,0}$ $Y_{4,1}$ $C_{4,0}$ | $Y_{4,2}$ $Y_{4,3}$ $C_{4,2}$ | $Y_{4,4}$ $Y_{4,5}$ $C_{4,4}$ | $Y_{4,6}$ $Y_{4,7}$ $C_{4,6}$ |
| $Y_{5,0}$ $Y_{5,1}$ $C_{5,0}$ | $Y_{5,2}$ $Y_{5,3}$ $C_{5,2}$ | $Y_{5,4}$ $Y_{5,5}$ $C_{5,4}$ | $Y_{5,6}$ $Y_{5,7}$ $C_{5,6}$ |
| $Y_{6,0}$ $Y_{6,1}$ $C_{6,0}$ | $Y_{6,2}$ $Y_{6,3}$ $C_{6,2}$ | $Y_{6,4}$ $Y_{6,5}$ $C_{6,4}$ | $Y_{6,6}$ $Y_{6,7}$ $C_{6,6}$ |
| $Y_{7,0}$ $Y_{7,1}$ $C_{7,0}$ | $Y_{7,2}$ $Y_{7,3}$ $C_{7,2}$ | $Y_{7,4}$ $Y_{7,5}$ $C_{7,4}$ | $Y_{7,6}$ $Y_{7,7}$ $C_{7,6}$ |

FIG. 3A

EVEN FIELD

| $Y_{0,0}$ $Y_{0,1}$ | $Y_{0,2}$ $Y_{0,3}$ | $Y_{0,4}$ $Y_{0,5}$ | $Y_{0,6}$ $Y_{0,7}$ |
|---|---|---|---|
| $C_{0,0}$ | $C_{0,2}$ | $C_{0,4}$ | $C_{0,6}$ |
| $Y_{2,0}$ $Y_{2,1}$ | $Y_{2,2}$ $Y_{2,3}$ | $Y_{2,4}$ $Y_{2,5}$ | $Y_{2,6}$ $Y_{2,7}$ |
| $C_{2,0}$ | $C_{2,2}$ | $C_{2,4}$ | $C_{2,6}$ |
| $Y_{4,0}$ $Y_{4,1}$ | $Y_{4,2}$ $Y_{4,3}$ | $Y_{4,4}$ $Y_{4,5}$ | $Y_{4,6}$ $Y_{4,7}$ |
| $C_{4,0}$ | $C_{4,2}$ | $C_{4,4}$ | $C_{4,6}$ |
| $Y_{6,0}$ $Y_{6,1}$ | $Y_{6,2}$ $Y_{6,3}$ | $Y_{6,4}$ $Y_{6,5}$ | $Y_{6,6}$ $Y_{6,7}$ |
| $C_{6,0}$ | $C_{6,2}$ | $C_{6,4}$ | $C_{6,6}$ |

ODD FIELD

| $Y_{1,0}$ $Y_{1,1}$ | $Y_{1,2}$ $Y_{1,3}$ | $Y_{1,4}$ $Y_{1,5}$ | $Y_{1,6}$ $Y_{1,7}$ |
|---|---|---|---|
| $C_{1,0}$ | $C_{1,2}$ | $C_{1,4}$ | $C_{1,6}$ |
| $Y_{3,0}$ $Y_{3,1}$ | $Y_{3,2}$ $Y_{3,3}$ | $Y_{3,4}$ $Y_{3,5}$ | $Y_{3,6}$ $Y_{3,7}$ |
| $C_{3,0}$ | $C_{3,2}$ | $C_{3,4}$ | $C_{3,6}$ |
| $Y_{5,0}$ $Y_{5,1}$ | $Y_{5,2}$ $Y_{5,3}$ | $Y_{5,4}$ $Y_{5,5}$ | $Y_{5,6}$ $Y_{5,7}$ |
| $C_{5,0}$ | $C_{5,2}$ | $C_{5,4}$ | $C_{5,6}$ |
| $Y_{7,0}$ $Y_{7,1}$ | $Y_{7,2}$ $Y_{7,3}$ | $Y_{7,4}$ $Y_{7,5}$ | $Y_{7,6}$ $Y_{7,7}$ |
| $C_{7,0}$ | $C_{7,2}$ | $C_{7,4}$ | $C_{7,6}$ |

B FRAME, LUMINANCE, EVEN FIELD

FIG. 9

4:2:2 CHROMINANCE, I OR PFRAME

4:2:2 CHROMINANCE, B FRAME, EVEN FIELD

FIG. 9A

4:2:0 CHROMINANCE, I OR P FRAME

FIG. 10

4:2:0 CHROMINANCE, B FRAME, EVEN FIELD

FIG. 10 A

Address calculation
Frame MC
 Luma
  ax = (ref_mb_y[10:5] * hsize) + ref_mb_x[10:5]), ref_mb_x[4]
  ay = ref_mb_ y[4:1], ref_mb_x[3]
 Chroma
  ax = (ref_mb_y[9:5] * hsize + ref_mb_x(9:4]), ref_ mb_x[3]
  ay = ref_mb_y[4:1], ref_mb_x[2]
Field Mc
Luma
  ax = (ref_mb_y[10:4] * hsize + ref_mb_x[l0:5]), ref_mb_x[4]
  ay = ref_mb_y(3:1], mvfs, ref_mb_x[3]
Chroma
  ax = (ref_mb_y[9:4] * hsize + ref_mb_x[9:4]), ref_mb_x[3]
  ay = ref_mb_y(3:1], mvfs, ref_mb_x[2]
Byte Count
Frame Picture
1 vector luma fetch:      cy = ~ref_mb_y[3:1]; 111; & ref_mb_y[3]
1 vector Chroma fetch:    cy = ~ref_mb_y[3:1]; & ref_mb_y[3:1]
2 vector luma fetch
  cy = ~ref mb_y|3:11
  cy = ref mb_yf3:1]
2 vector Chroma fetch
  cy = ~ref mb y[3:11
  2nd fetch cy = ref_mb_y[2:1] required if ref_mb_y[3]
Field Picture
1 vector luma fetch:      cy = ~ref_mb_y[3:1]; 111; & ref_mb_y[3]
1 vector Chroma fetch:    cy = ~ref_mb_y[3:1]; & ref_mb_y[3:1]
2 vector luma fetch
  cy = ~ref_mb_y[3:1]
  cy = ref_mb_y[3:1]
2 vector Chroma fetch
  cy = ~ref_mb_y[3:1]
  2nd fetch cy = ref_mb_y[2.1] required ref_mb_y[3]

FIG. 13

MOTION COMPENSATED DIGITAL VIDEO DECODING AND BUFFER MEMORY ADDRESSING THEREFOR

The present invention relates to digital video decoding, and more particularly, to buffer memory configuration, buffer memory address generation and video decoder implementation for the reproduction of moving pictures from digital signals, such as in broadcast television receiver systems, digital video compact disc playing systems and other digital video presentation systems.

BACKGROUND OF THE INVENTION

Recent times have seen an acceleration in efforts by suppliers of consumer electronics to greatly expand the amount and quality of information provided to users. The expanded use of multimedia information in communications and entertainment systems along with user demands for higher quality and faster presentations of the information has driven the communications and entertainment industries to seek systems for communicating and presenting information with higher densities of useful information. These demands have stimulated the development and expansion of digital techniques to code and format signals to carry the information.

Unlike most of the communication systems of the past, particularly television broadcast systems and other systems used for home entertainment, where analog signals have filled available bandwidths with single program real time signals in a straight forward format that includes much redundant information as well as much humanly imperceivable information, digital transmission systems possess the ability to combine and identify multiple programs and to selectively filter out redundant or otherwise useless information to provide capabilities for the transmission of programs having higher quality or having higher useful information carrying ability or density. As a result of the high technological demand for such capabilities, advances toward the specification and development of digital communications formats and systems have accelerated.

In furtherance of these advances, the industry sponsored Motion Pictures Expert Group (MPEG) chartered by the International Organization for Standardization (ISO) has specified a format for digital video and two channel stereo audio signals that has come to be known as MPEG-1, and, more formally, as ISO-11172. MPEG-1 specifies formats for representing data inputs to digital decoders, or the syntax for data bitstreams that will carry programs in digital formats that decoders can reliably decode. In practice, the MPEG-1 standards have been used for recorded programs that are usually read by software systems. The program signals include digital data of various programs or program components with their digitized data streams multiplexed together by parsing them in the time domain into the program bitstreams. The programs include audio and video frames of data and other information.

An enhanced standard, known colloquially as MPEG-2 and more formally as ISO-13818, has more recently been agreed upon by the ISO MPEG. This enhanced standard has grown out of needs for specifying data formats for broadcast and other higher noise applications, such as high definition television (HDTV), where the programs are more likely to be transmitted than recorded and more likely to be decoded by hardware than by software.

The MPEG standards define structure for multiplexing and synchronizing coded digital and audio data, for decoding, for example, by digital television receivers and for random access play of recorded programs. The defined structure provides syntax for the parsing and synchronizing of the multiplexed stream in such applications and for identifying, decoding and timing the information in the bitstreams.

The MPEG video standard specifies a bitstream syntax designed to improve information density and coding efficiency by methods that remove spacial and temporal redundancies. For example, the transformation blocks of 8×8 luminance pels (pixels) and corresponding chrominance data using Discrete Cosine Transform (DCT) coding is contemplated to remove spacial redundancies, while motion compensated prediction is contemplated to remove temporal redundancies. For video, MPEG contemplates Intra (I) frames, Predictive (P) frames and Bidirectionally Predictive (B) frames. The I-frames are independently coded and are the least efficiently coded of the three frame types. P-frames are coded more efficiently than are I-frames and are coded relative to the previously coded I- or P frame. B-frames are coded the most efficiently of the three frame types and are coded relative to both the previous and the next I- or P-frames. The coding order of the frames in an MPEG program is not necessarily the same as the presentation order of the frames. Headers in the bitstream provide information to be used by decoders to properly decode the time and sequence of the frames for the presentation of a moving picture.

The video bitstreams in MPEG systems include a Video Sequence Header containing picture size and aspect ratio data, bit rate limits and other global parameters. Following the Video Sequence Header are coded groups-of-pictures (GOPs). Each GOP usually includes only one I-picture and a variable number of P- and B-pictures. Each GOP also includes a GOP header that contains presentation delay requirements and other data relevant to the entire GOP. Each picture in the GOP includes a picture header that contains picture type and display order data and other information relevant to the picture within the picture group.

Each MPEG picture is divided into a plurality of Macroblocks (MBs), not all of which need be transmitted. Each MB is made up of 16×16 luminance pels, or a 2×2 array of four 8×8 transformed blocks of pels. MBs are coded in Slices of consecutive variable length strings of MBs, running left to right across a picture. Slices may begin and end at any intermediate MB position of the picture but must respectively begin or end whenever a left or right margin of the picture is encountered. Each Slice begins with a Slice Header that contains information of the vertical position of the Slice within the picture, information of the quantization scale of the Slice and other information such as that which can be used for fast-forward, fast reverse, resynchronization in the event of transmission error, or other picture presentation purposes.

The Macroblock is the basic unit used for MPEG motion compensation. Each MB contains an MB header, which, for the first MB of a Slice, contains information of the MB's horizontal position relative to the left edge of the picture, and which, for subsequently transmitted MBs of a Slice, contains an address increment. Not all of the consecutive MBs of a Slice are transmitted with the Slice.

The presentation of MPEG video involves the display of video frames at a rate of, for example, twenty-five or thirty frames per second (depending on the national standard used, PAL or NTSC, for example). Thirty frames per second corresponds to presentation time intervals of approximately 32 milliseconds. The capacity of MPEG signals to carry the information necessary for HDTV and other presentations providing high resolution video is achieved in part by exploiting the concept that there is typically a high degree of correlation between adjacent pictures and by exploiting temporal redundancies in the coding of the signals. Where two consecutive video frames of a program are nearly identical, for example, the communication of the consecutive frames requires, for example, only the transmission of one I-picture along with the transmission of a P-picture containing only the information that differs from the I-picture, or Reference Picture, along with information needed by the decoder at the receiver to reconstruct the P-picture from the previous I-picture. This means that the decoder must have provision for storage of the Reference Picture data.

Information contained in a P-picture transmission includes blocks of video data not contained in a Reference I- or P-picture as well as data needed to relocate in the picture any information that is contained in the previous I- or P-picture that has moved. The technique used in MPEG systems to accomplish P-picture construction from a Reference picture is the technique of Forward Prediction in which a Prediction Error in the form of a Prediction Motion Vector (MV) is transmitted in lieu of the video data of a given or Target MB. The MV tells the decoder which MB of the I- or P- Reference Picture, is to be reproduced as the Target MB.

With B-pictures, a Bidirectional Temporal Prediction technique called Motion Compensated Interpolation, is used. Motion Compensated Interpolation is accomplished by transmitting, in lieu of the video data for a Target MB, an MV that specifies which MB to copy either from the previous Reference Picture or from the next future Reference Picture, or from the average of one MB from each of the previous and next future Reference Pictures.

An MPEG Motion Compensated Prediction video decoder of a type that is practical for HDTV must possess a Reference Picture data storage capability that permits construction by the receiver decoder of the B- and P-frames containing the motion vectors that specify MB of the reference pictures. In order to provide sufficient data retrieval speed to perform the motion compensation calculations, static or on chip memory (SRAM) could be provided. The use of SRAM having the storage capacity necessary to store a video picture is a straightforward but expensive way to provide the capability. The use of an off-chip DRAM buffer as an alternative to on-chip static ram, however, presents the problem of memory access time exceeding the interframe time availabilities of the program. For example, the specification in the MVs of the MBs that must be retrieved to perform the motion compensation prediction calls for access to the storage medium in an order that has a substantial random component. DRAM memory is by nature divided into memory segments called "pages". Consecutive reads of the memory within a page require substantially less time than consecutive reads that call for the crossing of page boundaries. The random memory access requirements of motion compensation prediction results in a number of memory page crossings, which can result in memory access time requirements that prevent the efficient and effective use of DRAM memory buffers.

In addition to the retrieval of MBs from reference pictures, the storage and retrieval of data of individual pels can adversely affect the efficiency of the decoding process. This is particularly the case with post filtering, where low pass filtering is applied pixel-to-pixel to remove rapid spacial fluctuations in values. For the presentation of video, the decoder must generate both a luminance (overall brightness or intensity) value for each pel and a chrominance (color pair) value for each pel. The MPEG-2 standard, however, calls for the ability to decode color video programs at bit rates as low as 4 Mbits per second, as for both progressive (non-interleaved) or interleaved video.

With interleaved video, a video frame is formed of two fields, one containing the even scan lines of a picture (the "top field") and one containing the odd scan lines of the picture (the "bottom field"). The fields are alternately output to a video display in each 32 millisecond cycle, allowing 16 milliseconds for each field to be output. Certain standards such as the CCIR-601 standard, which must be supported by MPEG, include an interleaved format. For interleaved video motion compensation in MPEG-1, all pictures are frame pictures that include both the top field and the bottom field, but in MPEG-2, the I-frames, P-frames and B-frames may be either full video frames of both top and bottom fields or may include only a top field or a bottom field.

Further, depending on the bitrate and format employed, one chrominance pair may be coded for each luminance value. This is referred to as a 4:4:4 chrominance format, and requires the highest bitrate or coding efficiency. Alternatively, other formats provide for one chrominance value for each two or four luminance values, by subsampling chrominance 2:1 horizontally, or both horizontally and vertically. Such formats are referred to as the 4:2:2 format and the 4:2:0 format, respectively. With interleaved pictures, where a picture of alternating top rows of luminance pels is first transmitted and then a picture of alternating bottom rows is transmitted, alternating rows of chrominance pair pel values are transmitted with fields of the luminance pels, with those chrominance pels transmitted with the "top" field relating to a 2×2 array of top field luminance values, while those chrominance pels transmitted with the "bottom" field relate to an interleaved 2×2 array of bottom field luminance values. As a result, a straight-forward storage and retrieval of luminance and chrominance data in the order it is received can complicate and substantially slow the decoding process.

In particular, MPEG-2 video decoders must decode signals with interleaved video in what has been called, and referred to above as, the CCIR-601 (and which has also been called the ITU-R) color video format, where each pixel is coded as a luminance 8 bit value sampled at a 13.5 MHz rate along with a red chrominance value and a blue chrominance value, 8 bits each and sampled at a 6.75 MHz rate. In this format, the video frames are 720 pels per line, and either 480 lines per frame at 30 frames per second or 576 lines per frame at 25 frames per second. Uncompressed, this requires 216 Mbits/s, but the signal may be compressed to as few as 2 Mbits/s, with 4 Mbits/s being a typical rate.

Each of the formats referred to above and other formats, together with the variety of formats that MPEG receivers must decode, make it difficult to effectively and efficiently buffer the data for the video being reproduced at the receiver. Accordingly, in the decoding and reproduction of MPEG video programs, there is a need for an effective and efficient memory usage scheme, particularly for performing Motion Compensation Prediction and post filtering.

SUMMARY OF THE INVENTION

A primary objective of the present invention is to provide for the efficient storage of digital video information at the decoder of digital receiver, and particularly, to provide for the time and memory efficient storage and retrieval of digital video information in a receiver such as of an MPEG-2 video presentation system.

It is a further particular objective of the present invention to provide a memory buffer memory preferably of a DRAM type and a storage order of video data therein that minimizes the frequency of page crossings during retrieval of the data.

In accordance with the principles of the present invention, there is provided a buffer memory storage sequence by which video data is stored by macroblock in buffer memory with a plurality of macroblocks stored on the same buffer memory page. In particular, the data of a video picture are mapped into the buffer memory in an order that exploits the likelihood that consecutive reads and writes of the memory will involve macroblocks stored on the same memory page, thereby reducing page crossings during memory access and increasing data storage and retrieval speed. In the preferred embodiment of the invention, the memory mapping utilizes a recurring pattern that extends the advantages of the invention to buffer memories of differing page sizes. Preferably, data is stored with scan lines within a macroblock and between adjacent macroblocks having an increased incidence of lying in the same line of a memory array, and thus stored consecutively in the memory and on the same page of the buffer memory. In accordance with such principles of the present invention, more than one horizontally adjacent macroblock stored consecutively in memory, preferably with the same scan lines of both stored consecutively, preferably on the same DRAM page, and preferably with scan line data stored at constant increments.

In accordance with the preferred embodiment of the present invention, the data representing each of the four 8×8 pixel video blocks of each macroblock are stored, line by line, in the sequence of (A) upper left block, (C) lower left block, (B) upper right block and (D) lower right block. This pattern is repeated for each macroblock, from the left to the right edge of the picture, of each horizontal row of macroblocks, from the top to the bottom of the picture.

Preferably, the buffer memory includes three sections each capable of storing the video data for one picture. One section stores the data of one I- or P-frame, one section stores the data of the next subsequent P-frame, while the third section stores the reconstructed or interpolated picture as the result of a received B-frame. The buffer memory sections are each divided into two halves, one for storing Y or luminance data for the respective picture and one for storing U, V or chrominance data for the respective picture. Also preferably, the I and P frame pictures are full frame pictures that include alternating rows of top and bottom field data interleaved as the data appears in a display, while the B-frame pictures are preferably for one or the other field only, with the corresponding section of the memory for the B-frame pictures being divided into two parts each capable of storing data for one field.

In accordance with the preferred embodiment of the invention, the buffer memory is logically arranged in an array of storage positions 16 bits or rows wide and divided into 32 byte wide columns, or columns wide enough to store video data for eight 32 bit pixels, or one line of a video block. Each column will thus store picture data in the formats discussed above with one block per column of a interleaved (both even and odd line for I- and P-frame) video picture or two blocks per column of a field (even or odd lines only for B-frame) of a video picture.

The memory mapping and data storage concepts of the preferred embodiment, each page of, for example, 4096 bytes, will store two horizontally adjacent macroblocks of interleaved video. Alternatively, such a page will store a four horizontally adjacent macroblocks of any one even or odd line field of non-interleaved video. As a result, either two or four horizontally adjacent macroblocks are stored on the same line of memory of the same memory page for convenient outputting to post-filtering hardware. Where larger memory pages are used, more horizontally adjacent macroblocks will be stored on the same page of memory.

Further, when a 16×16 or 17×17 pixel square of data is retrieved from or written to buffer memory, the number of pages of memory that must be addressed is minimized. This provides efficiency when copying data from an I-frame or a P-frame when reconstructing a P-frame or a B-frame picture.

These and other objectives and advantages of the present invention will be more readily apparent from the following detailed description of the preferred embodiments of the invention, in which:

BRIEF DESCRIPTION OF THE DRAWINGS

FIGS. 3 and 3A are diagrammatic representations of the upper left corner of a non-interleaved television picture of CCIR-601 4:2:0 and 4:2:2 chrominance format, respectively, with pel luminance and chrominance data variables noted thereon.

FIG. 4 is a diagrammatic representation of the upper left corner of an interleaved television picture of CCIR-601 4:2:0 chrominance format with pel luminance and chrominance data variables noted thereon.

FIG. 5 is a diagrammatic representation of the upper left corner of an interleaved television picture of CCIR-601 4:2:2 chrominance format with pel luminance and chrominance data variables noted thereon.

FIG. 8A is a buffer memory map similar to FIG. 8 of stored luminance data for one field B pictures in accordance with one preferred embodiment of the present invention.

FIG. 9 is a buffer memory map diagram similar to FIG. 8 of stored chrominance data for full frame I and P pictures of 4:2:2 chrominance format in accordance with one preferred embodiment of the present invention.

FIG. 9A is a buffer memory map diagram similar to FIG. 9 of stored chrominance data for one field B pictures of 4:2:2 chrominance format in accordance with one preferred embodiment of the present invention.

FIG. 10 is a buffer memory map diagram similar to FIG. 9 of stored chrominance data for full frame I and P pictures of 4:2:0 chrominance format in accordance with one preferred embodiment of the present invention.

FIG. 10A is a buffer memory map diagram similar to FIG. 10 of stored chrominance data for one field B pictures of 4:2:0 chrominance format in accordance with one preferred embodiment of the present invention.

FIG. 13 is a list of equations used for DRAM address calculations by the motion compensation section of FIG. 7A.

DETAILED DESCRIPTION OF THE PREFERRED EMBODIMENTS

Figure 1:
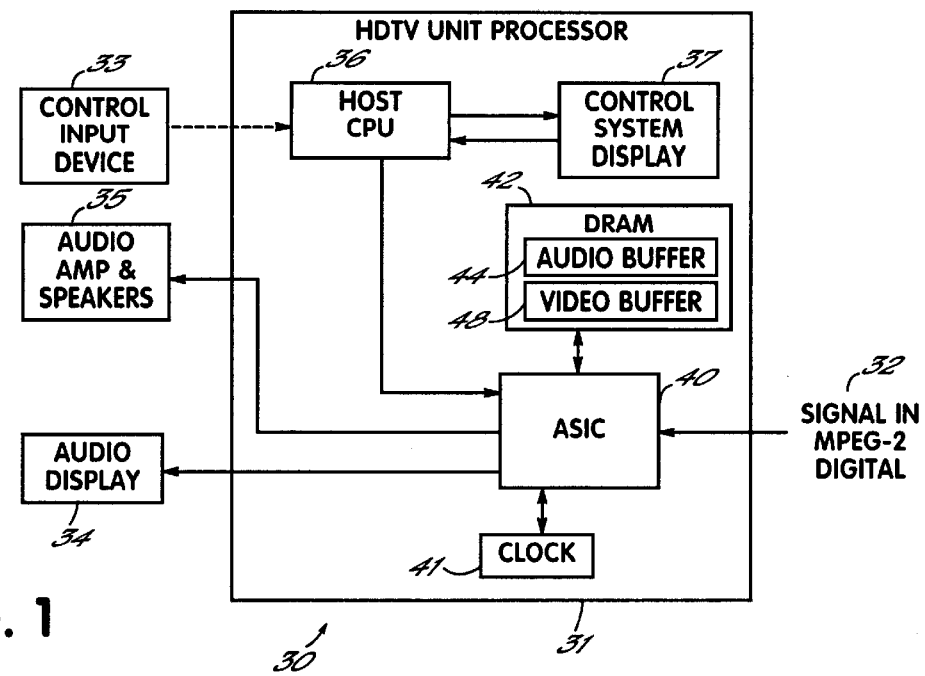
FIG. 1 is a block diagram representing an MPEG-2 receiver embodying principles of the present invention.

One embodiment of the present invention is for use in high definition television (HDTV). FIG. 1 diagrammatically represents an HDTV receiving and audio and video presentation system 30, which includes a signal processor and controller unit 31 having a program signal input 32 in the form of an antenna, a cable, CD ROM or other medium through which an MPEG-2 digital input signal is received, a control input from a control input device 33 through which a user makes program and presentation format selections, which may include interactive communications, a video output which connects to a video display or video presentation subsystem 34, and an audio output which connects to an audio amplifier and speaker system or audio presentation subsystem 35. The unit processor 31 includes a central processing unit or host CPU 36 which is programmed to process user commands from the control input device 33 and to operate a control system display 37, which displays information, menu selections and other information to the user and which may or may not also function as an input device. The unit processor 31 also includes an Application Specific Integrated Circuit or ASIC 40, which, when provided with configuration and selection information by the host CPU 36, decodes the raw digital bitstream signal from signal input 32 for output to the video and audio presentation devices 34 and 35. The unit processor 31 further includes a local system clock 41, which connects preferably to the ASIC 40, and a buffer memory 42. The buffer memory 42 is in-line, sequential memory, such as dynamic random access memory or DRAM (such as a synchronized DRAM or SDRAM), and preferably includes a contiguous variable length buffer 44 for use by the ASIC 40 for audio signal processing.

Figure 2:
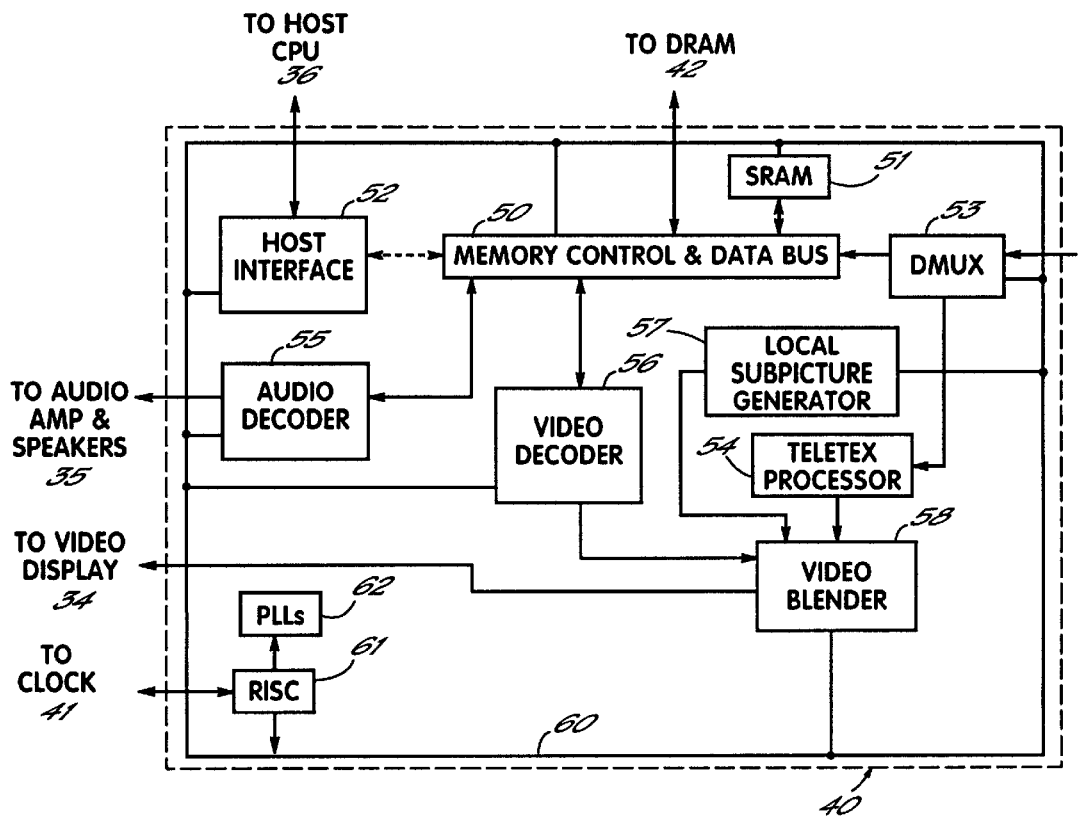
FIG. 2 is a block diagram representing the ASIC portion of the receiver of FIG. 1.

FIG. 2 diagrammatically illustrates the configuration of the ASIC 40. The ASIC 40 is a single integrated circuit chip that is logically divided into a number of components or functions. The ASIC 40 includes a memory control and a data bus or gbus, represented by memory controller and bus component 50 in the diagram, which has at least one received data input connection and a plurality of two-way data flow connections. One representation of two-way connections internal to the ASIC 40 is a connection to static random access memory or SRAM 51 of the ASIC 40, which is diagrammatically represented for convenience as block 51 of the ASIC 40, but is actually distributed among the various decoders and other circuits of the ASIC 40. Another of the two-way connections is to a host interface unit 52 which connects externally with the host CPU 36, and another is to the DRAM module 42 which is external to the ASIC 40.

The ASIC 40 also includes a demultiplexer or DMUX 53 which has an input connected to the signal input 32 of the unit processor 31 and an output connected to the received data input of the bus of component 50. The DMUX 53 has a text output connected to a teletex processor 54, that is also provided on the ASIC 40 for processing collateral information such as closed caption script, interactive menus and other such data. The unit processor 40 further includes an audio decoder 55, a video decoder 56 and a local subpicture generating unit 57. The audio decoder 55 has an input side connected to the one of the two-way data connections of the bus of component 50 and an output connected externally of the unit processor 35 to audio presentation subsystem 35.

The video decoder 56 receives video program data via another of the two-way data connections of the bus of component 50, decodes by decompressing, transforming and otherwise processing the received video data, and sends the decoded and partially processed video picture data back through bus of component 50 to a video buffer 48 in the DRAM 42. This processing preferably includes the storing of decoded I picture frame data, the application of motion compensation calculations to extrapolate information from a buffered I picture to construct and store P-picture frame data, and the application of motion compensation calculations for the construction and storage of B-picture fields from buffered I and/or P frames and received B-picture data. The video decoder 56 also processes the motion compensated pictures stored in DRAM 42 for post-filtering and other post processing and for output by the video presentation system 34.

The subpicture generating unit 57 generates local picture information that includes control menus, display bar-graphs and other indicia used in control interaction with the user. A blender 58 is provided which combines the local video from the subpicture unit 57 with teletex information from the teletex processor 54, and with post-processed video program being output from the video decoder 56. The output of the blender 58 is connected externally of the unit processor 31 to the video presentation subsystem 34.

The ASIC 40 is provided with a control bus 60 to which a control port of each of the components 50–57 of the ASIC is connected. The ASIC 40 is also provided with a Reduced Instruction Set Controller or RISC 61, which serves as the local CPU of the ASIC 40. The RISC 61 controls the functions of the components 50–57 of the ASIC 40 through control data ports connected to the control bus 60. The RISC 61 has a clock input that connects externally of the ASIC 40 to the local system clock 41, and has another input connected to phase locked loop circuitry or PLLs 62 within the ASIC 40 used to time internal clock signals.

An example of a video signal that the system 30 must decode is a two dimensional picture made up of blocks of 64 pels in an 8×8 square array as is illustrated diagrammatically in FIG. 3. At the transmitter, the data representing these pels is coded as a block by application of, for example, a Discrete Cosine Transform (DCT), which is decoded as a block at the receiver of the system 30. In FIG. 3, the luminance and chrominance are represented for a fully interleaved full frame picture, with each pel represented by a luminance value Y, designated $Y_{0,0} \ldots Y_{7,7}$ for the various rows and columns of the block, each of 8 bits, or 1 byte. Where the coding is of the CCIR-601 4:2:0 chrominance format, as illustrated in FIG. 3, 2:1 horizontal and vertical subsampling has produced a signal having one chrominance data pair for each 2×2 group of 4 luminance values Y, for a total of 16 chrominance data pairs per block. The CCIR-601 4:2:0 chrominance format is the format expected to be found in broadcast HDTV. For this format, each chrominance data pair is represented by a chrominance pair value C, designated $C_{0,0}$, $C_{0,2}$, ..., $C_{6,4}$, $C_{6,6}$. Each of the chrominance data pairs includes an 8-bit blue chrominance value u and an 8-bit red chrominance value v. As a result, each 2×2 group of four pels is represented by 32 bits of luminance data and 16 bits of chrominance data, or 64 bytes of luminance data and 32 bytes of chrominance data per 8×8 pel block.

Where the coding is of the CCIR-601 4:2:2 chrominance format, as illustrated in FIG. 3A, 2:1 horizontal and 1:1 vertical subsampling produces a signal having one chrominance data pair for each 2×1 group of 2 luminance values Y, for a total of 32 chrominance data pairs per block. Each chrominance data pair is represented by a chrominance pair value C, designated $C_{0,0}$, $C_{0,2}$, ..., $C_{7,4}$, $C_{7,6}$. Each of the chrominance data pairs includes an 8-bit blue chrominance value u and an 8-bit red chrominance value v. As a result, each 2×2 group of four pels is represented by 32 bits of luminance data and 32 bits of chrominance data, or 64 bytes of luminance data and 64 bytes of chrominance data per 8×8 pel block. Some digital video discs (DVDs) and professional applications are expected to employ this format.

Where the picture is intended for interleaved display, that is by the alternate display of separate top (even line) and bottom (odd line) fields, to be interleaved upon display as a full frame picture, the even or top field includes the even rows of luminance values $Y_0$, $Y_2$, $Y_4$ and $Y_6$ and the even rows of chrominance values $C_0$ and $C_4$, while the odd or bottom field includes the odd rows of luminance values $Y_1$, $Y_3$, $Y_5$ and $Y_7$ and the even rows of chrominance values $C_2$ and $C_6$, as illustrated in FIG. 4, with each chrominance pair corresponding to a 2×2 group of four luminance values of the same field. With CCIR-601 4:2:2 chrominance format, only 2:1 horizontal subsampling is used, so that the data also contains the odd rows of chrominance data $C_1$, $C_3$, $C_5$ and $C_7$ (FIG. 5), yielding a signal having one chrominance data pair for each pair of two luminance values Y of the same line, for a total of 32 chrominance data pairs per block. Each chrominance data pair is accordingly represented by a chrominance pair value C, designated $C_{0,0}$, $C_{0,2}$, ..., $C_{7,4}$, $C_{7,6}$. As a result, each 2×2 group of four pels is represented by 32 bits of luminance data and 32 bits of chrominance data. The even or top field includes the even rows of luminance values $Y_0$, $Y_2$, $Y_4$ and $Y_6$ and the even rows of chrominance values $C_0$, $C_2$, $C_4$ and $C_6$, while the odd or bottom field includes the odd rows of luminance values $Y_1$, $Y_3$, $Y_5$ and $Y_7$ and the even rows of chrominance values $C_1$, $C_3$, $C_5$ and $C_7$, as illustrated in FIG. 5, with each chrominance pair corresponding to two luminance values of a line of the corresponding field.

In FIGS. 3, 3A, 4 and 5, the grid boxes group the luminance values to which each of the chrominance values in the boxes correspond.

Figure 6:
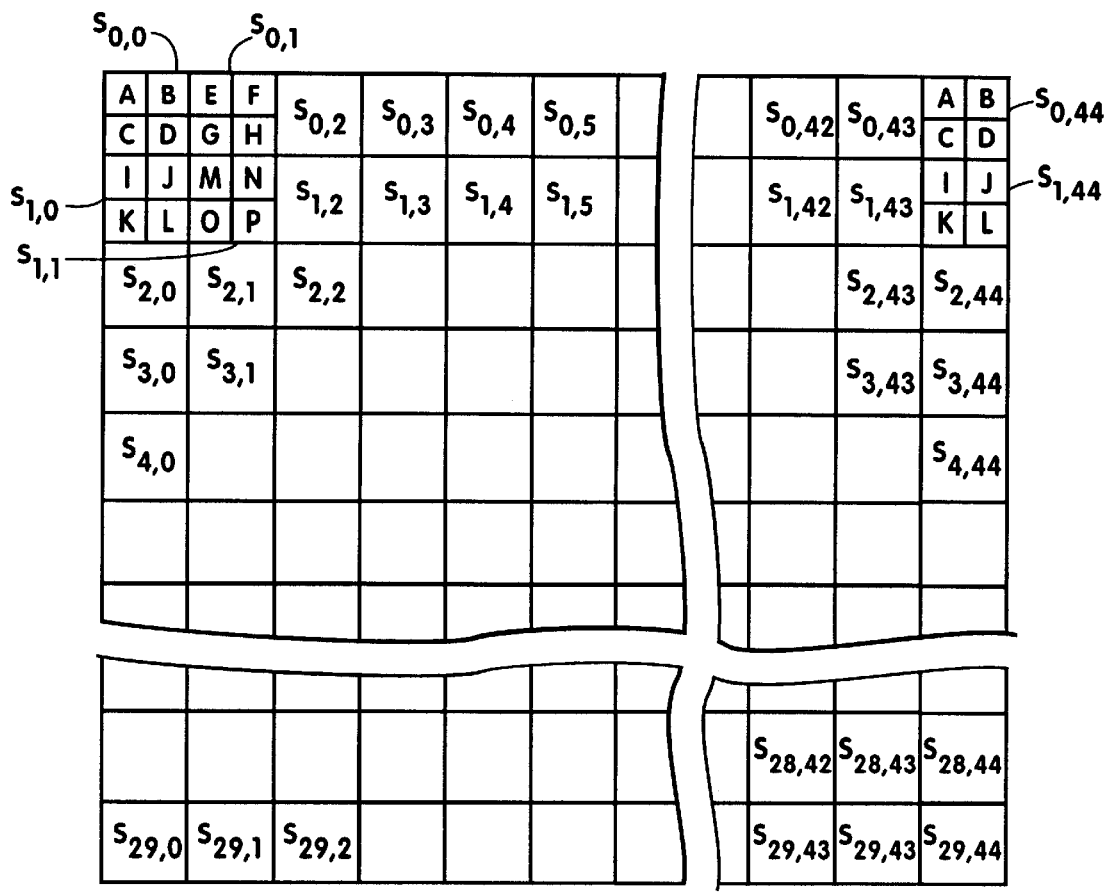
FIG. 6 diagrammatically represents the pel block arrangement of a television picture.

The buffer memory map according to the preferred embodiment of the present invention is described in the context of an HDTV program for producing video frames, for example as represented by the picture in FIG. 6. The memory map is illustrated for a picture made up of an array of pels 720 wide and 480 high, grouped as a 90×60 array of 8×8 blocks of pels, or 45×30 16×16-pel macroblocks. However, the pictures may alternatively be in the form of, for example, an array of pels 1280 wide and 1024 high or some other such format. A 160×128 pel array picture would, for example, be made up of a 160×128 array of 8×8 blocks of pels, or 80×64 16×16 pel macroblocks of four 8×8 pel blocks each.

The 720×480 pel picture represented in FIG. 6 includes an array of 30 rows, each of 45 macroblocks S, which are labeled $S_{0,0}$ through $S_{0,44}$ for the topmost row through $S_{29,0}$ through $S_{29,44}$ for the bottommost row. Each macroblock S is formed of four 8×8-pel blocks. The blocks within the four macroblocks of a 2×2 square of macroblocks are further labeled A–D, E–H, I–L and M–P according to a repeating pattern, for each 2×2 macroblock square, to facilitate the description of the mapping of the order of the blocks in the DRAM 42. This labeling order is used below in the description of the memory map that embodies principles of the present invention.

Figure 7:
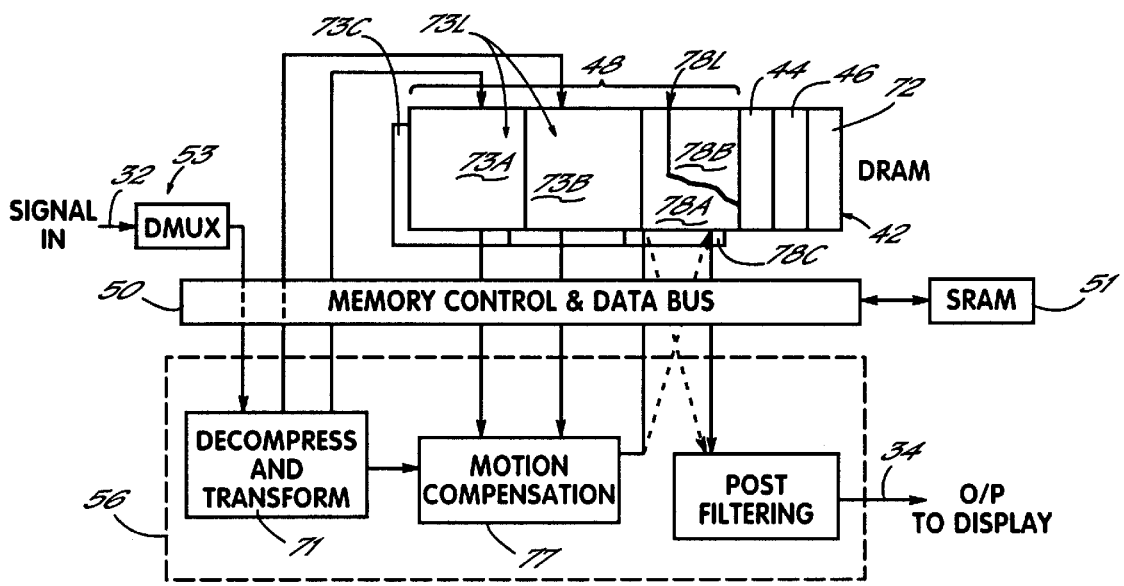
FIG. 7 is a detailed block diagram representing the DRAM buffer and video decoder portions of the MPEG-2 receiver of FIGS. 1 and 2.

The information flow and memory configuration that employs the memory map according to the preferred embodiment of the present invention is illustrated in the simplified diagram of FIG. 7. In FIG. 7, the raw signal of the incoming bitstream at input 32 is demultiplexed in the DMUX 53 and sent through the data bus of component 50 to the video decoder 56. The decoder 56 processes the signal in a decompression and transformation section 71, which extracts information from the various headers for interpretation by the RISC 61. The interpretation may involve storage of information to SRAM 51 on the ASIC 40 or to a portion 72 of the DRAM 42 reserved for the storage of headers, miscellaneous parameters and data. For example, information in the Video Sequence Header may contain picture size and aspect ratio data that might be used to by the ASIC to reassign memory segment labels to the video buffer 48 of DRAM 42 in accordance with the scheme of FIG. 6 and to keep track of the size of the buffer memory 48 needed for data buffering. This Video Sequence Header, for example, tells the RISC 61 whether a CCIR-601 formatted program is being received, and what that format is.

As groups-of-pictures (GOPs) are received, presentation delay requirements and other data relevant to the entire GOP are extracted from the GOP header and interpreted by the RISC 61, which responds appropriately. As each picture of the GOP is received, a picture header is extracted and interpreted by the RISC 61 to determine the picture type (e.g., I, P or B), the display order of the picture relative to other pictures or its relative place in the stream, and relevant other information concerning the picture. In response to information in these headers, the RISC 61 controls the video decoder 56 and particularly the decompression and transformation section 71, as well as the memory controller of component 50 to store the picture data from the incoming pictures of the GOP which is carried out in accordance with principles of the invention.

In particular, the section 71, under control of the RISC 61, tends to the decoding and buffering, in a reference picture buffer 73 of the video buffer 48, of full frame reference pictures, either in the form of an I-picture, which is stored without reference to data from previously received pictures, or of a P-picture, which is stored after copying data from a previously received I- or P-picture. Such a reference picture is stored as a fully interleaved, that is full-frame, picture containing the alternating even and odd scan lines of the frame in the top to bottom order in which they will appear in the displayed picture. In the preferred embodiment, two portions of the buffer 73 are provided, portions 73A and 73B, one for storing the previous full frame picture in the form of an I or a P-frame, and the other for storing the next full frame picture in the form of a P frame. Such P-frames, may be written to this memory by copying, with or without motion compensation, portions of the previous picture from the other portion 73A,73B of the buffer 73. When a further P-frame is received, it will over write one of the frames in the memory portions 73A or 73B, typically the earlier of the two in presentation order, to become the next, "next" frame, while the frame in the other portion 73A or 73B of the buffer becomes the next "previous" frame. When a further I-frame is received, it will over write one of the frames in the memory portions 73A or 73B, typically the frame in the portion 73A. Each of the buffer memory portions 73A and 73B are further divided into halves 73L and 73C, each to store the respective luminance data and chrominance data for the picture being stored.

The decoding and storage of the picture data involves the processing of Slices of consecutive variable length strings of macroblocks (MBs) and storing them in specific memory locations assigned to the specific MBs in accordance with a memory map of described in more detail below. A Slice Header, is read and interpreted, which contains information of the vertical position of the Slice within the picture, its quantization scale and other information that may vary from Slice to Slice. MB headers for each macroblock are similarly read, which contain information of the horizontal position of the first MB of a Slice, relative to the left edge of the picture, and a relative address increment for subsequently received MBs of the same Slice. This operation places each macroblock of the picture and the data of each of its four 8-pel by 8-pel blocks in memory positions corresponding to their positions in the picture which are diagrammatically illustrated, for example, in FIG. 3A.

Figure 8:
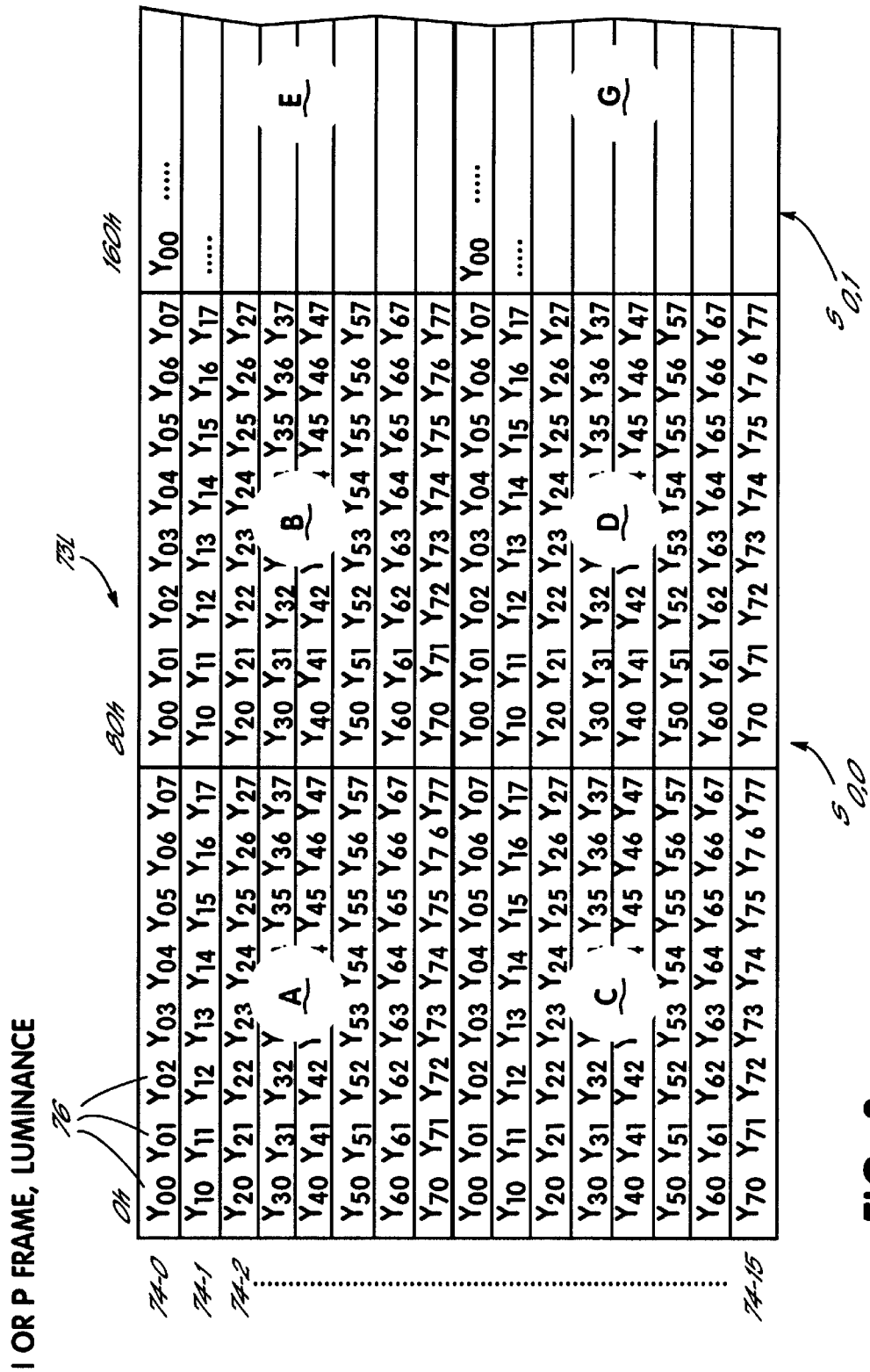
FIG. 8 is a buffer memory map diagram of stored luminance data for full frame I and P pictures in accordance with one preferred embodiment of the present invention.
Figure 11:
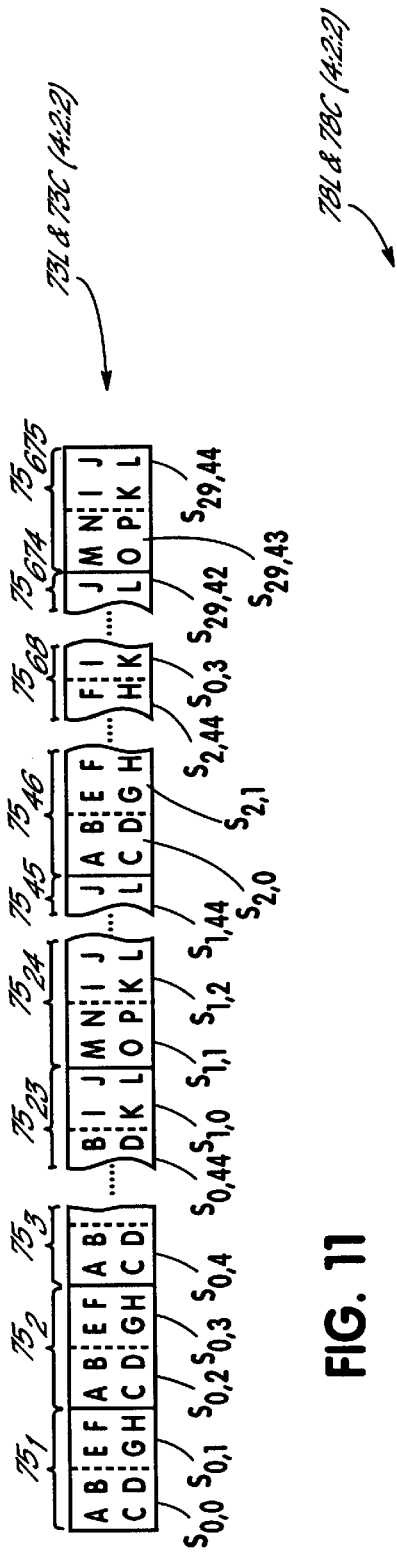
FIG. 11 is a larger scale diagram of the buffer memory map diagrams of FIGS. 8 and 9.

The DRAM 42, as illustrated diagrammatically in FIGS. 8 and 11, is preferably 16 Mbits (2 MBytes) in size for systems for reproducing 4:2:0 chrominance format pictures. For 4:2:2 chrominance pictures, 32 Mbits is preferred. The DRAM 42 is preferably configured in 16 bits in width, illustrated as logical rows 74-0 through 74-15, in 32-bit (4-byte) wide columns 81, and in sequential pages 75, preferably as large as practical. The DRAM 42 is preferably addressable 64 bits at a time, via a data bus that is 64 bits wide, more particularly as described in commonly assigned and copending U.S. patent application Ser. Nos. 08/846,590 and 08/846,941, filed Apr. 30, 1997, invented by Edward J. Paluch, hereby expressly incorporated by reference herein. Currently, practical sized pages 75 of currently commercially available DRAM are $2^{12}$ (or 4096) bits in size, or 512 bytes. The bytes 76 of the reference picture buffer 73 each hold either one 8 bit luminance value or one 8-bit of chrominance value of a two chrominance value pair. The blocks of the reference I and P pictures are each mapped into the buffer portions 73A,73B in the sequence represented by the alphabetical order corresponding to the blocks illustrated in FIG. 6, resulting in a DRAM map for the reference picture buffers 73A and 73B that is illustrated in FIG. 11.

The mapping of the screen data to the buffers 73A,73B involves locating the datum for the upper left pel of the screen at a base for the respective buffer 73A or 73B on the first row 74-1 of the memory 42, followed by the data for the remaining seven pels of the block, which is block A of macroblock $S_{0,0}$ of the picture. Each of the remaining seven lines of block A, which are 8 bytes of data each, from top to bottom of the block, are stored in consecutive address locations of the memory, respectively in memory rows 74-2 through 74-8. Next are stored the eight lines of the next block below the first block, which is block C. This fills the 16-row width of the memory 42. For the full frame I or P pictures in buffer portions 73A and 73B of buffer half 73L, the storage of luminance data of the picture will include the data of two vertically adjacent blocks, for example blocks A and C, of the same macroblock S, which will occupy memory occupying address locations 0h to 7Fh. Next, the two vertically adjacent blocks, for example blocks B and D, that are immediately to the right of the and horizontally adjacent to the previously stored blocks A anc C are stored across the width of the buffer beginning at an address 80h. This pattern is followed with each horizontally adjacent pair of two vertically adjacent blocks being stored at increments of 80h addresses until the right edge of the screen is reached. As a result, data for the pixels across each scan line of the uppermost row of macroblocks $S_{0,0}$ through $S_{0,44}$ of the picture are adjacent in the same horizontal line 74 of the buffer memory, as illustrated in FIG. 11.

Then, the next row of macroblocks, macroblocks $S_{1,0}$ through $S_{1,44}$, are stored. Because each macroblock occupies 256 bytes of data, with 512 byte size pages 75, the luminance data for two macroblocks is stored in each page 75 of the memory 42.

Figure 9:
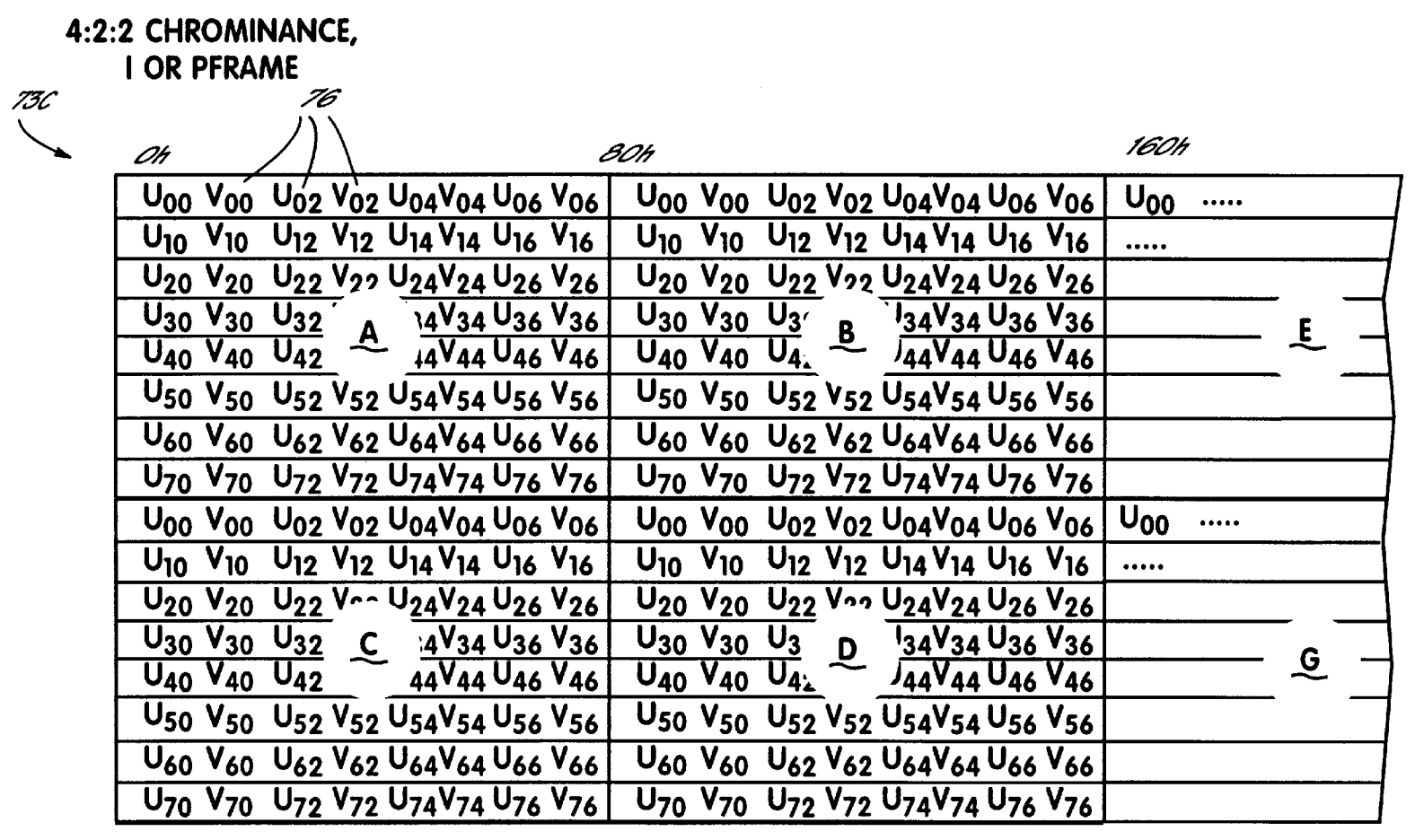

The RISC 61 controls the base addresses of each of the portions of memory 73A and 73B and the halves thereof 73L and 73C. In FIG. 8, the storage locations 0h and 80h are relative to base addresses for the luminance and chrominance data buffers for the frame. These base addresses can be changed by the RISC 61 based on the storage requirements needed for the various pictures or picture formats. With the CCIR-601 4:2:2 chrominance format, the sizes of the luminance data buffers 73L and the chorminance data buffers are the same (see FIGS. 8 and 9), since there are half as many chrominance value pairs C as there are luminance values in 4:2:2 format (see FIG. 3A), but two one-byte luminance values for each two byte chrominance data pair. The pel luminance data Y are stored in each of the portions 73L of the buffer 73 with the blue and red chrominance values u and v of each chrominance pair C stored in a chrominance buffer 73C.

When a P-picture or a B-picture is received, construction of a full frame or field involves the extrapolation or interpretation of the variable data of the P- and B-pictures and the calculation of Motion Compensation vectors that specify the relocation of macroblocks from one or both reference frames stored in the reference picture buffer 73. In the case of P-pictures, the full frame P-picture is constructed and stored in one of the portions 73A,73B of the buffer 73 from data copied in part from the previous I or P-picture in the other portion 73B,73A of the buffer 73. The motion compensation processing is handled by a motion compensation portion 77 of the hardware of the video decoder 56.

In the case of B-pictures, the one field of the picture is reconstructed at a time and stored in one of two overlapping halves of a B-picture buffer 78. The two halves of buffer 78, halves 78A and 78B, respectively store the alternate top and bottom fields of the next picture to be presented to the output device. The buffer 78 is configured as a circular buffer with the two halves 78A,78B thereof overlapping so that the size of the buffer 78 is optimally approximately 0.53 as large as the full-frame portions 73A,73B of the buffer 78. The 0.5 allows for the storage of one full field, which is half of a full frame, where the 0.03 allows for the storage of the data for one row of macroblocks of one field of the picture. When either of the buffer halves 78A or 78B contains a complete reconstructed field, its size will be 0.50 of a frame, and the buffer 78A or 78B containing the field will store the field data until the presentation time stamp (PTS) for that field equals the time in the system time clock, indicating that the field is ready for display. When this occurs, the field data will be read from the buffer 78A or 78B, by scanning horizontally from top to bottom, with the scanned data being processed by post filtering section 79 of the video decoder and sent to the video presentation device 32 for display. The preferred operation of the post-filtering section 79 is described in U.S. patent application Ser. No. 60/059,135 filed Sep. 17, 1997, by the inventors hereof and entitled Post Filter Hardware Design, hereby expressly incorporated herein by reference.

When the presentation of one reconstructed B-picture field from buffer 78 is begun, the decoding and storing of the next field is simultaneously triggered. As the first horizontal row of macroblocks from the stored field is being post-filtered and output, the decoding of the first horizontal row of macroblocks from the other field is reconstructed and stored in the remaining 0.03 frame size portion of the memory 78. When the first row of macroblocks has been output and the output of the second row of the first stored field is begun, the second row of macroblocks from the other field is stored to the memory 78, overwriting the first row of macroblocks of the first field. The buffer 78 may be made larger, for example to correspond in size to about 0.56 or 0.59 of the size of the full frame buffers 73A and 73B, to respectively hold two or three additional rows of macroblocks rather than one, to allow greater flexibility in this reading and writing of the data of consecutive alternating fields.

Figure 8A:
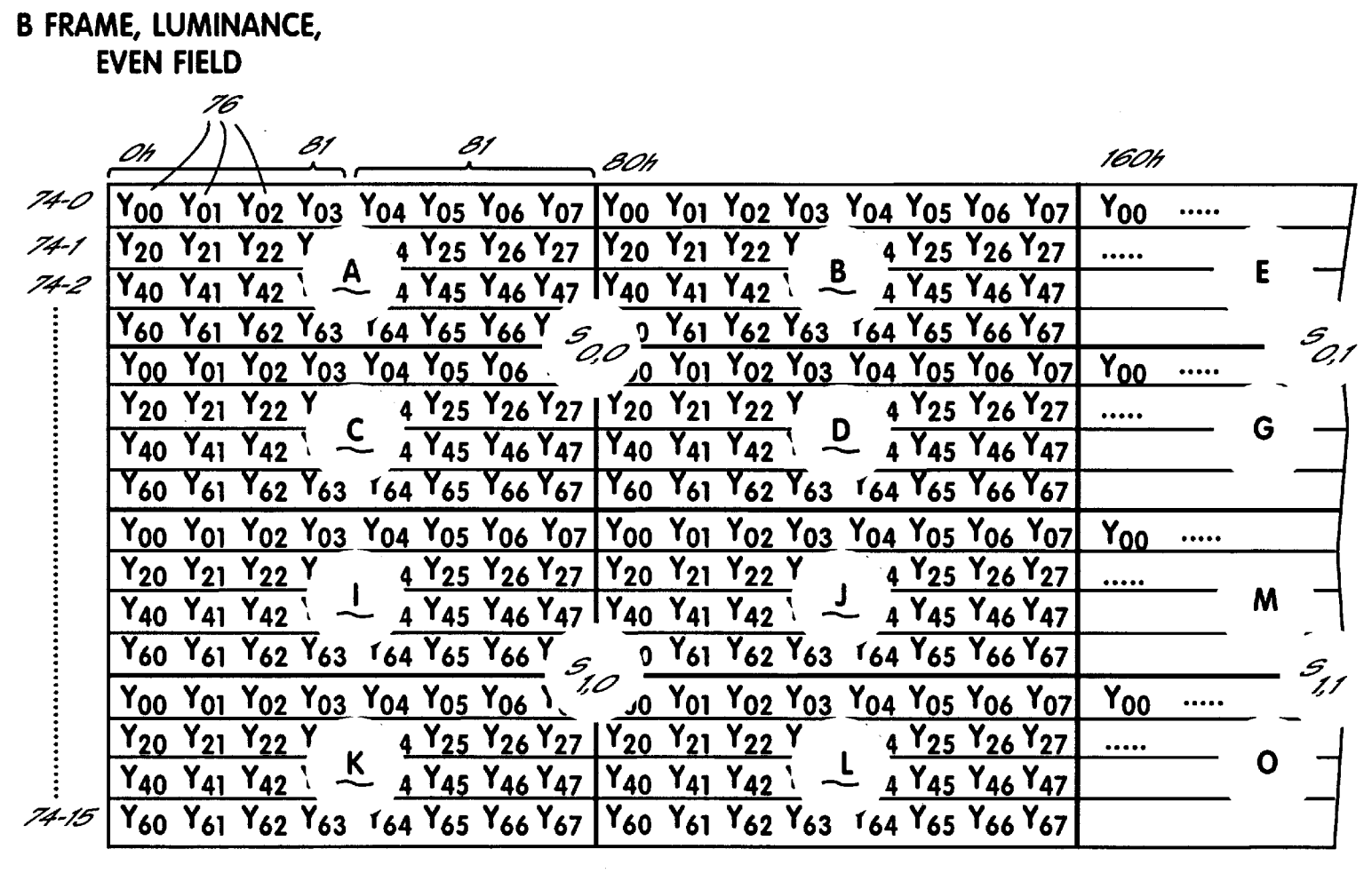
Figure 11A:
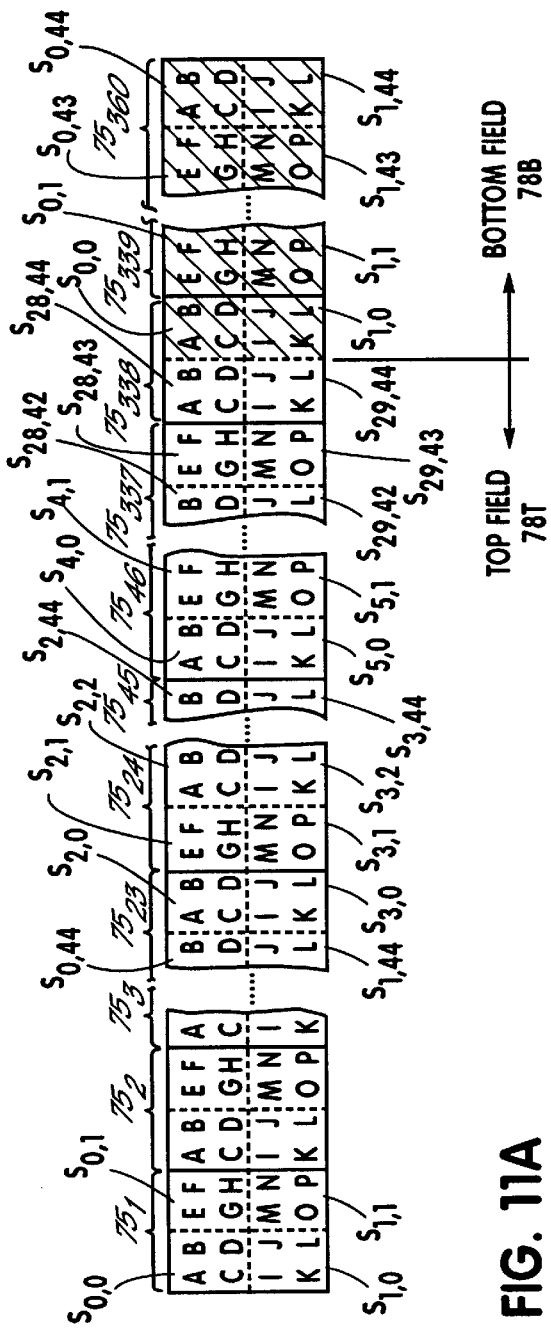
FIG. 11A is a diagram similar to FIG. 11 of the buffer memory map diagrams of FIGS. 8A and 9A.

The bytes 76 of the reconstructed B-pictures that are stored in the buffer 78 also hold one 8-bit luminance or chrominance value. The reconstructed blocks of the B-pictures are mapped into the buffer 78A or 78B in the sequence represented by the alphabetical order corresponding to the blocks illustrated in FIG. 6 that results in a DRAM map for the reference picture buffer 78 that is illustrated in FIG. 8A. The order of storage of the screen data in the buffers 78A,78B also involves beginning at the upper left corner of the screen and storing each odd or even line of a block, which is 8 bytes of data, from top to bottom of the block, followed by the lines of the next block below the first block until the width of the buffer, 16 rows, is reached. In FIG. 8A, only the even field in buffer 78A is illustrated. For the odd field in buffer 78B, the leftmost subscripts will be 1,3,5 and 7, indicating the odd rows of the blocks. Because only one field of data is being stored in the buffer 78A or 78B, only half as many rows are stored, so that the odd or even rows of four blocks can be stored across the 16-row width of the buffer memory 42. For the field sized B-pictures in buffer 78, the luminance data for four vertically adjacent blocks, for example blocks A, C, I and K of two vertically adjacent macroblocks S, will be stored across the 16-bit width of the memory. The four vertically adjacent blocks, for example blocks B, D, J and L, immediately to the right of and horizontally adjacent to the previously stored blocks are stored across the width of the buffer at an address 80h greater than the storage location of the first four blocks. The overall layout of the memory for buffer 78L luminance and for buffer 78C in the case of 4:2:2 formated chrominance is illustrated in FIG. 11A. As a result, data for the pixels across a scan line of the picture are adjacent in the same horizontal line 74 of the buffer memory for B-pictures as well as for the I and P-pictures.

Figure 9A:
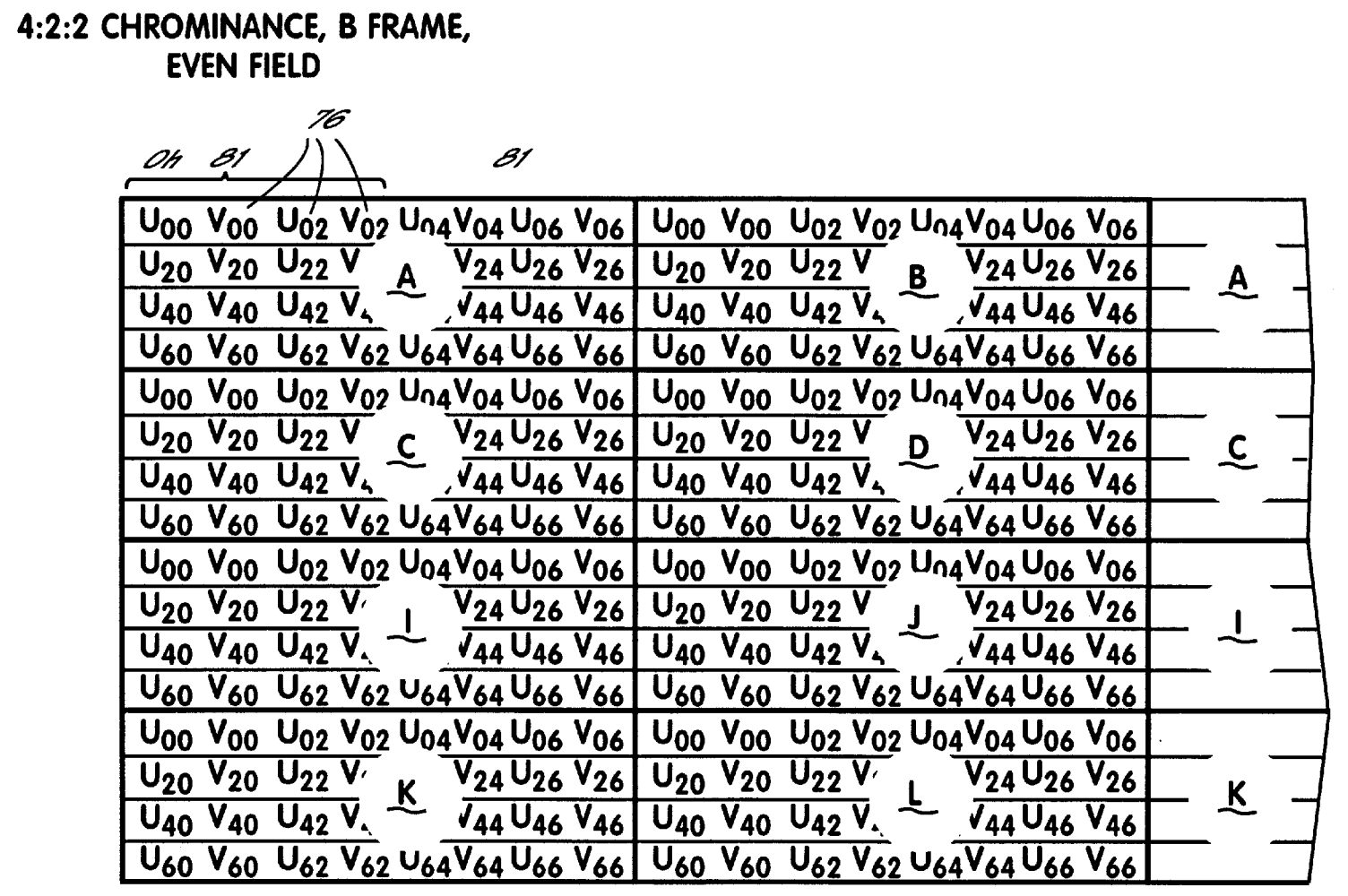

The RISC 61 controls the base addresses of each of the portions of memory 78A and 78B and halves thereof 78L and 78C, which contain the respective luminance and chrominance data for reconstructed B-pictures. In FIGS. 8A and 9A, the storage locations 0h and 80h are relative to the base addresses. These base addresses can be changed by the RISC 61 based on the storage requirements needed for the various pictures or picture formats, and in fact rotate through the buffer 78 as one field overwrites the other. With the CCIR-601 4:2:2 chrominance format, the sizes of the luminance data buffer 78L and the chrominance data buffer 78C are the same, since there are two one-byte luminance values for each two byte chrominance data pair. The pel luminance data Y are stored in each of the portions 78L of the buffer 78 with the blue and red chrominance values u and v of each chrominance pair C (FIG. 5) stored in a chrominance buffer 78C.

Figure 10:
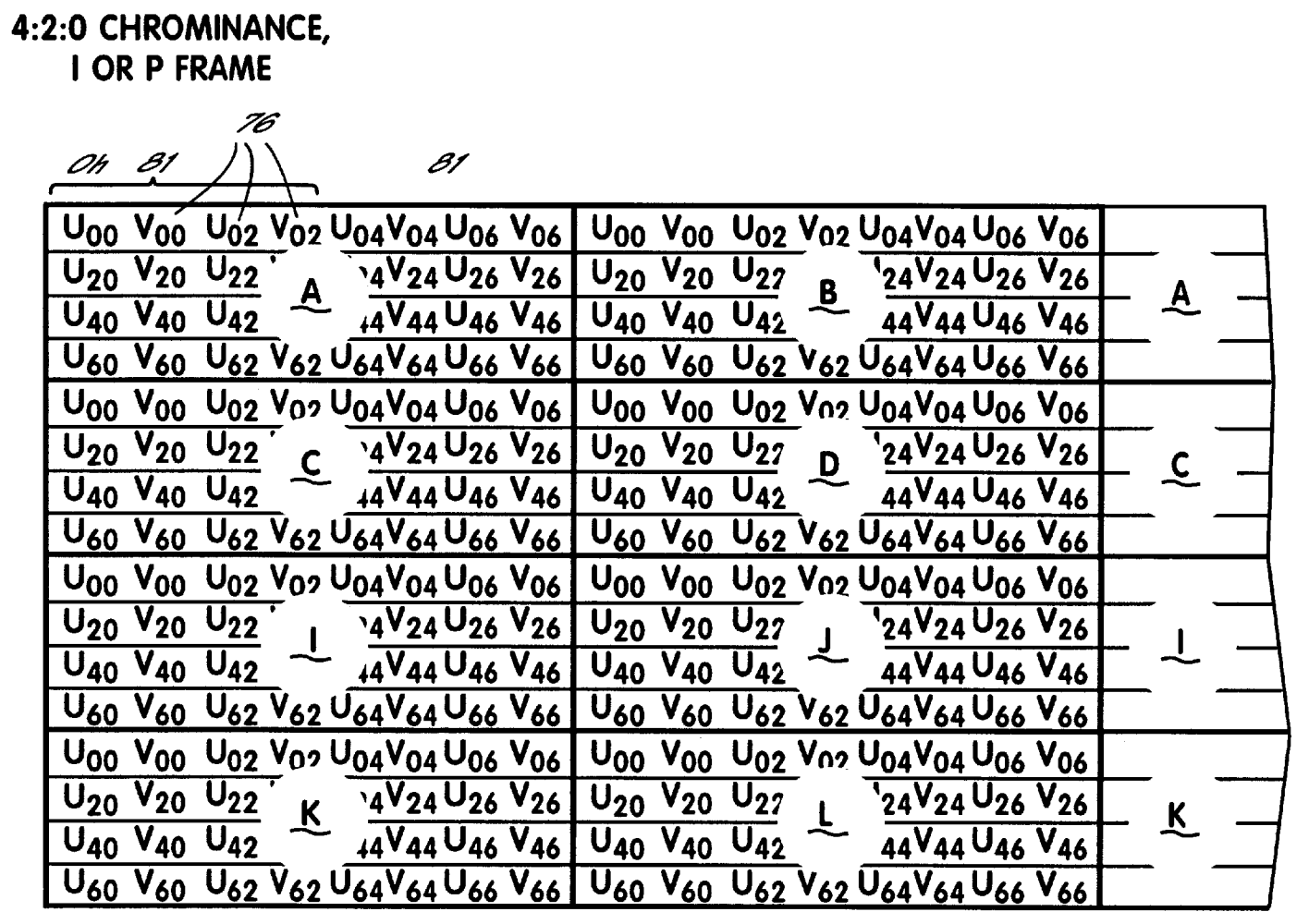
Figure 10A:
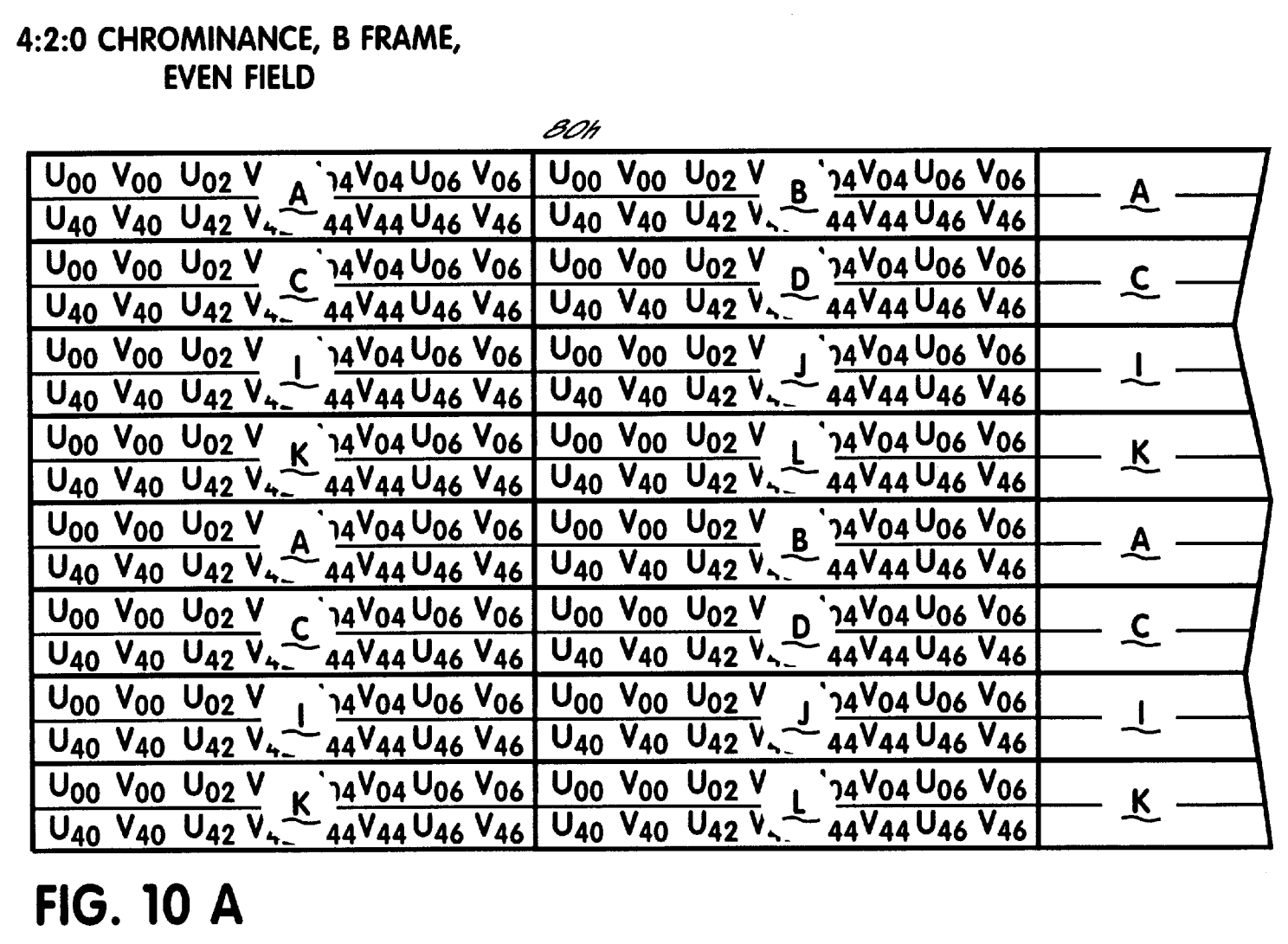
Figure 11B:
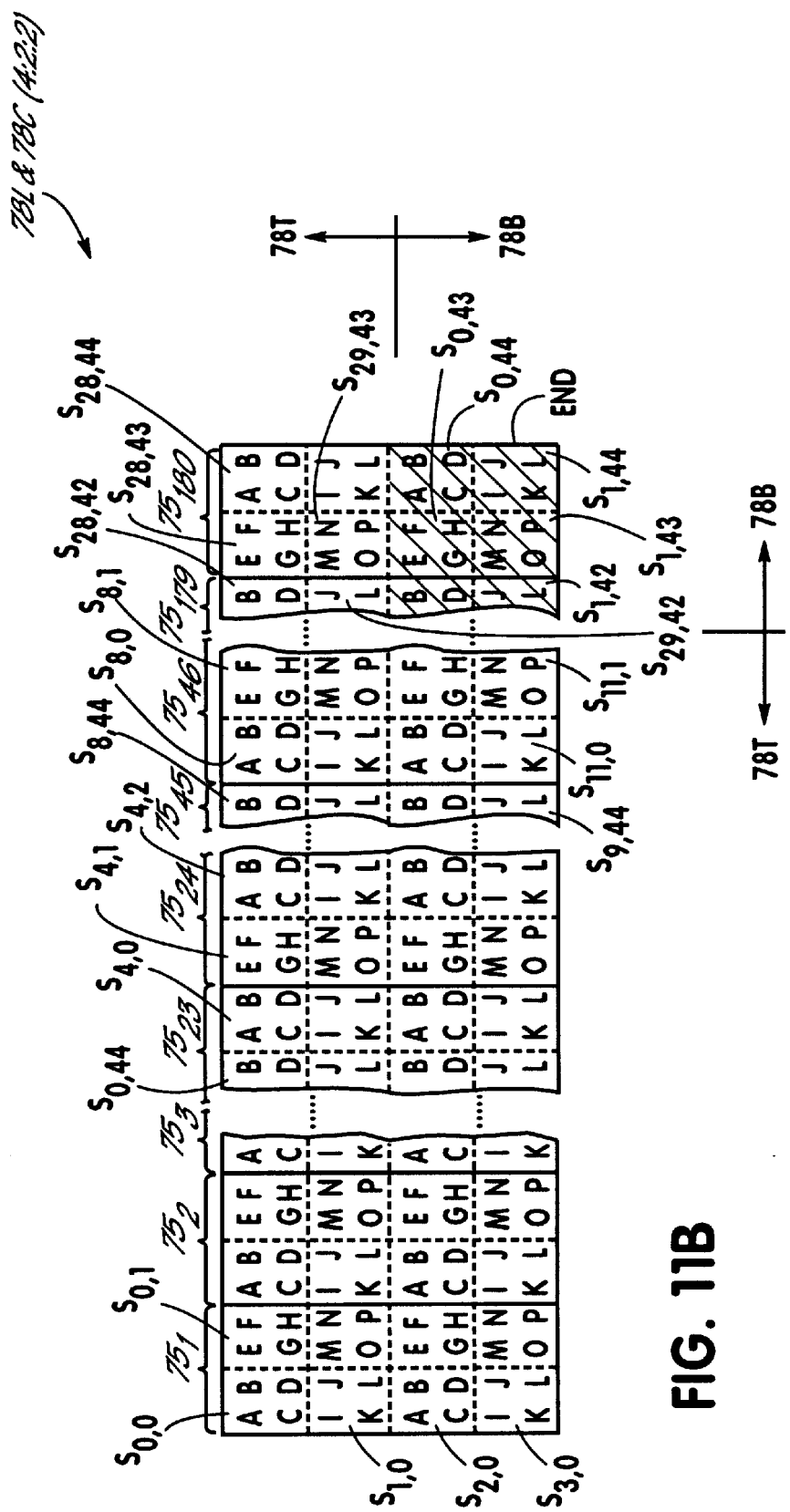
FIG. 11B is a diagram similar to FIG. 11A of the buffer memory map diagram of FIG. 10A.

With 4:2:0 chrominance format, the chrominance data for a frame or field is one half of that for chrominance data for 4:2:2 chrominance format, and one half that of the luminance data for the frame or field. In this case, which is the expected case for broadcast HDTV, the chrominance frame data will be stored as illustrated in FIG. 10. This is the same mapping that is used for one field of luminance, which accordingly indicates that the chrominance buffer portions 73C of frame buffers 73A and 73B are each 0.5 the size of frame buffers 73A and 73B. The overall memory map for the chrominance buffer portions 73C are the same as for one field's worth (left portion) of the B-frame buffer illustrated in FIG. 11A. The B-picture chrominance data of 4:2:0 chrominance format illustrated in FIG. 10A, with eight vertically adjacent blocks or four vertically adjacent macroblocks extending across the 16-row width of memory 42. The overall arrangement of the memory for 4:2:0 chrominance data in the B-field buffers 78A and 78B is illustrated in FIG. 11B.

An advantage of the memory map of FIGS. 8–8A, 9–9A, 10–10A and 11–11B is the decreased likelihood that any given attempt to retrieve or store a macroblock of the reference picture from or to the reference picture buffer 73 will require the crossings of a page boundary. Page boundary crossings impose a substantial time penalty on the processing of the data, so any elimination of page boundary crossings in the retrieval of data is highly desirable. The alphabetically designated storage order of the blocks provides a statistical reduction in the likelihood that a request to retrieve macroblock data will cross a page boundary in the memory. In addition, the storage arrangement provides further reduction in the page crossing likelihood where the block-to-page ratio were to increase through the use of a more efficient data format or as memory of increased page size becomes available. Further, the arrangement of data so that the same lines of adjacent blocks are adjacent on the same line of memory increases the efficiency of data storage and retrieval. Also, provision of chrominance data of the same pixel in close proximity in memory, so that a single memory read will retrieve all relevant chrominance data for the pixels, increases the efficiency of memory storage and retrieval as well as the efficiency of the use of the processing capacity of the ASIC 40. Scan line output from both the frame buffers 73A and 73B and the field buffers 78A and 78B can be made by merely incrementing the address of the data by 80h increments in the memory controller of component 50.

The motion compensation hardware 77 constructs a video frame or field from received B-picture data and information stored in the I- and P-picture buffer 73. The reconstructed video frame or field is stored in a video output buffer 78 in DRAM 42 for post-filtering by post-filter hardware 79 and buffered output to video presentation system or display 34. The storage of the reconstructed picture for display at two interleaved fields is provided, with the video output buffer 78 being divided into the two halves, buffer 78T, which stores the top or even field data of a frame, and buffer 78B, which stores the bottom or odd field data of a frame.

Video output and post-filtering can take place from either B-field buffers 78A,78B or from the I or P-frame buffers 73A,73B. The output and post-filtering from I or P-frame buffers takes place one field at a time, with odd or even rows being read from the buffer 73, depending on whether bottom or top field is being filtered and displayed. With the video output either buffer 73 or 78, mapped as illustrated and described above, the output of the data across lines of display follows rows 74 of the memory, which can be made optimum memory reading and addressing and with a minimum of page boundary crossings. The optimal reading occurs in 64 bit memory read cycles in which data is read from the memory that is illustrated in FIGS. 8, 8A, 9, 9A, 10 and 10A, in rectangular array. For example, corresponding lines of data of blocks A, B, E and F of horizontally adjacent macroblocks lie in the same line of the picture, with the data of lines of blocks I, J, M, and N, or of blocks C, D, G and H, or of blocks K, L, O and P, respectively, lying on the same lines of the picture. Accordingly, the storage and retrieval of reconstructed data to the buffers 73 and 78 are made with reduced page boundary crossings, thereby improving the overall processing efficiency of the receiver. In addition, one of the fields can be output from one of the buffer halves 78T or 78B while a field is being constructed in the other buffer half.

Figure 12:
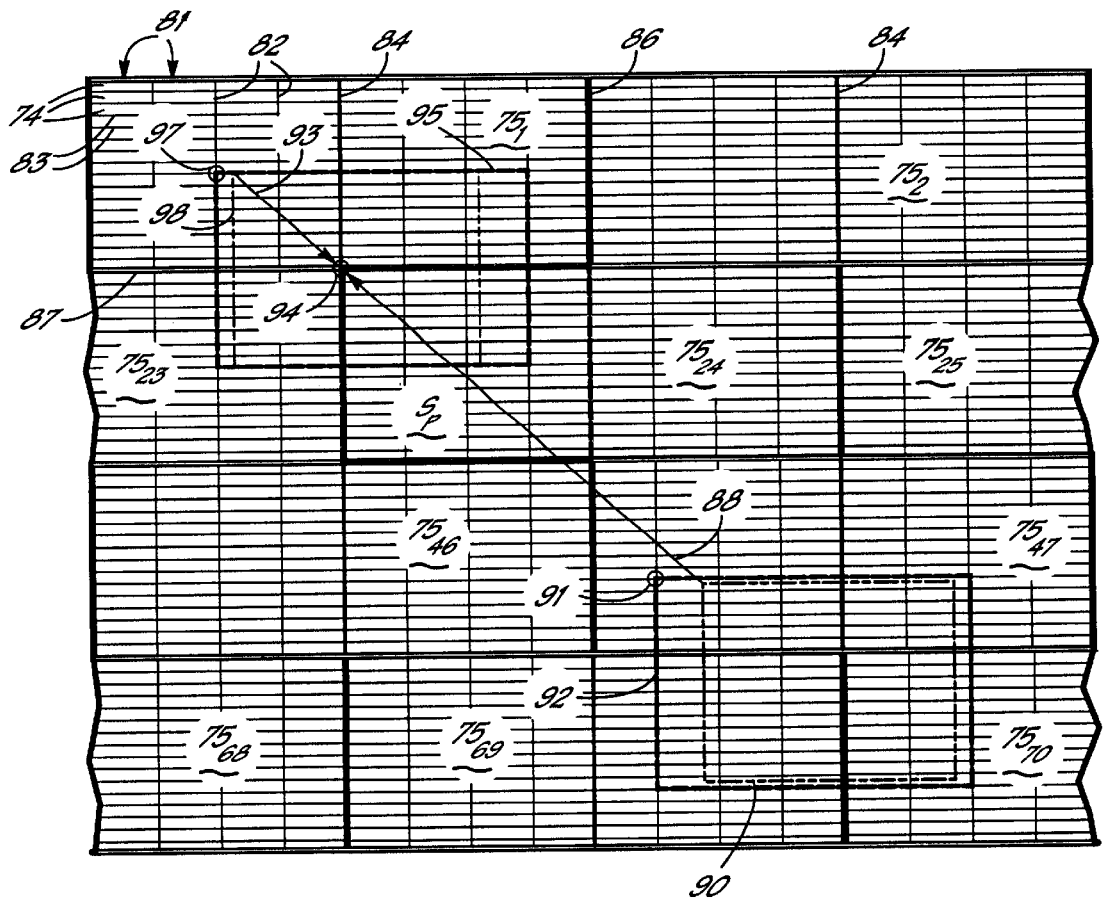
FIG. 12 is a diagram representing motion compensation vector calculations for retrieval of data from full frame buffer memory for luminance of FIG. 8 or 4:2:2 chrominance data of FIG. 9.
Figure 12A:
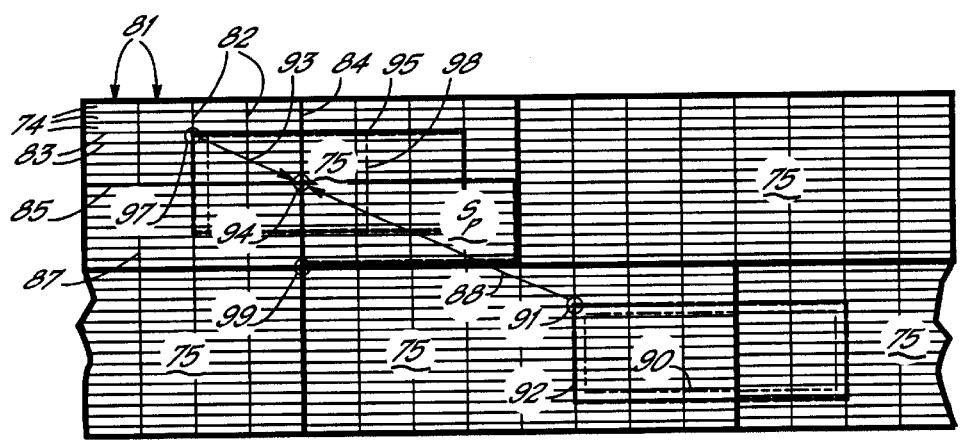
FIG. 12A is a diagram, similar to FIG. 12, representing motion compensation vector calculations for retrieval of data from full frame buffer memory 4:2:0 chrominance data of FIG. 10.

The manner in which the memory map, according to the principles of the invention, provides an economy of page crossings, or rather provides a low ratio of pages per data retrieval or storage requirement from and to the DRAM 42 is illustrated in FIG. 12 for reads and writes from and to a full frame I or P-frame luminance buffer 73L (or 4:2:2 chrominance buffer 73C), and in FIG. 12A for reads and writes from full frame chrominance buffer 73C (for 4:2:0 chrominance. This is particularly beneficial with reads from the reference picture buffers 73 because the motion compensation vectors can specify any pel or half pel location as that of the 16×16 pel data to be copied from a reference picture. (For B-pictures in field buffers 78, blocks are only written and then only to the original macroblock base addresses.

As explained in detail in the Paluch applications incorporated by reference in the discussion above, the preferred DRAM 42 is arranged in 16 logical rows 74 and in 32-bit wide columns 81, so that the intersection of one row and one column includes four 8-bit bytes of information, such as four luminance values (for four horizontally adjacent pels) or four chrominance bytes (or two 2-color chrominance value pairs). For fully interleaved frames of video data, a rectangle of eight rows by four 32-bit columns in the full frame picture buffers 73 define either the luminance or the chrominance (in 4:2:2 format) for an 8×8 pel block of a picture or two vertically adjacent 8×8 pel blocks of such data for the even or odd field in field buffers 78. Accordingly, for fully interleaved frames of video data, a rectangle of sixteen rows by eight 32-bit columns in the full frame picture buffers 73 such data for a 16×16 pel macroblock S of a picture, or two vertically adjacent 16×16 pel macroblocks for the even or odd field. Further, as explained in detail in the Paluch applications, the memory controller of component 50 can address logical rectangles of data in contiguous (frame mode) or alternate (field mode) rows or adjacent columns, up to the 16-row width of the memory of up to a predetermined number of columns.

The memory mapping described above facilitates the efficient and rapid storage and retrieval of data in the DRAM 42 in connection with two primary functions of the video decoder 56. These functions include the temporal filtering function of motion compensation, in which reference macroblocks of I- or P-picture data are read from one or both of the full frame buffers 73A,73B and reconstructed extrapolated or interpolated macroblocks are written either to P-picture frames in buffer 73 or B-picture fields in buffer 78 for output after or between the presentations of the reference frames. Because motion compensation calculations employ half-pel interpolation in the reconstruction process, such data transfers involve the retrieval and storage of 17×17 pel blocks of data based at any pel location on a picture. With 32-bit wide data reads and writes as described above, this calls for the retrieval and storage of 17×20 pel blocks of data. The present invention facilitates the storage and retrieval of such data blocks without an excess of page crossings, that is, without the need to address a large number of pages to perform such read and write operations.

These facilitated functions of the video decoder 56 also include the spacial post-filtering function and the outputting of the fields of data from the frame or field buffers 73 or 78 for transmission to the display 34. This post-filtering and outputting involves the reading of one or more adjacent or alternate scan lines of pixel data across the entire width of the screen, for example, across 720 pixels. Typically, only one or two lines of data are so read. With the present invention, the data are also read from the scan lines with a relatively small number of page crossings. The present invention optimizes the reading and writing of data for both the motion compensation functions of the video decoder 56 and for the post-filtering and output functions of the decoder 56.

FIGS. 12 and 12A are illustrations of the memory maps according to one embodiment of the invention showing the layout of the pages 75 of the memory 42 in an array that corresponds to that of a picture. In FIG. 12, the pages 75 arranged according to the two dimensional layout of the luminance data for frame pictures stored in the buffers 73L, while in FIG. 12A, the pages 75 arranged according to the two dimensional layout of the 4:2:0 chrominance data for frame pictures stored in the memory buffers 73C. In FIGS. 12 and 12A, the individual 8-bit bytes 76 or pel data values are not illustrated, but the 32-bit (4-byte) columns 81 are differentiated by the light vertical lines 82, with the rows 74 being differentiated by the light horizontal lines 83. The macroblocks S of 16×16 pels are differentiated by the medium weight vertical lines 84 and in FIG. 12A also by medium weight horizontal lines 85. Adjacent memory pages 75 are separated by the heavy vertical lines 86. The memory controller of component 50 is capable of addressing rectangular arrays of adjacent columns 81 and adjacent or alternate rows 74, which arrays can cross page boundaries 86 between horizontally adjacent memory pages, although separate memory address operations are required to read or write each horizontally adjacent page that is included in such a rectangle of addressed data. Double horizontal lines 87 are used in the drawing to differentiate vertically adjacent macroblocks S that lie on different non-adjacent pages 75 of the buffer memory 42. The memory controller of component 50 cannot address a rectangle of data that crosses such a boundary 87, since the pages are not physically adjacent in the memory 42, but only the data on these pages happens to represent pixels from macroblocks that appear adjacent on the display.

An example of how motion compensation is carried out with the memory map in FIG. 12 where the luminance or 4:2:2 chrominance data of a full frame macroblock $S_p$ of a P-picture, say in buffer 73B, is to be rewritten with a 16×16 pel square 90 (superimposed on FIG. 12 for illustration) of data from a reference I- or P-picture that is displaced, as specified by a motion compensation vector 88, at some relative vertical and horizontal distance in buffer 73A. The motion vector 88 may specify, for example, that the 16×16 pel square 90 that is to be copied is located, for example, 25½ pels below and 23 pels to the right of the macroblock to be reconstructed. In general, retrieval of the specified 16×16 pel square 90 from DRAM 42 may occur as a 16×16 pel square or as rectangles of 17×16 pels, 16×20 pels or 17×20 pels. Retrieval of only the 16×16 pel square 90 is possible where the vector 88 calls for vertical displacement of an even number of pels and horizontal displacement of a number of pels that is divisible by four. Vertical displacement of a half pel is met with retrieval of a 17 row rectangle where horizontal displacement of a number of pels that is not divisible by four or that includes a half pel is met with retrieval of a 20 byte (5 column) wide rectangle.

In the case of the square 90, which is displaced 25½×23 pels, retrieval of the data to be copied from the reference picture in buffer 73A occurs with the memory controller of component 50 addressing a 17×20 pel rectangle 92 of data originating at base address 91 of the buffer 73A in the DRAM 42. This retrieval uses two requests for rectangular arrays of data, since the horizontal boundary 87 divides the logical rectangle to be retrieved into to physically non-contiguous rectangles of data, one on pages $75_{69}$ and $75_{70}$ and one on page $75_{47}$. These two requests are managed by the motion compensation logic 77 of the video controller 56. The retrieval operations for rectangle 92 from buffer 73A involve retrieval from three memory pages, pages $75_{47}$, $75_{69}$ and $75_{70}$ of the buffer 73A, while the write operation of macroblock $S_p$ to buffer 73B involves a writing to only one page, page $75_{24}$ of the buffer 73B. After half pel interpolation is performed by the video decoder 56 on the retrieved data, the 16×16 pel macroblock of data $S_p$ is extrapolated from the copied data and the reconstructed macroblock is written to buffer 73B at base address 94.

With the retrieval of a rectangle of luminance data for construction of a B-field in buffer 78, where a macroblock $S_B$, for example having a base location 99 in buffer73B, is to be reconstructed, the data to be copied from reference pictures may be specified by two motion vectors, one motion vector such as the vector 88 of FIG. 12 indicating the use of data from 16×16 pel square 90 of data from a reference I- or P-picture in buffer 73A, and in addition by a similar vector, for example vector 93 indicating the use of data from another 16×16 pel square 98 of data from a reference P-picture in buffer 73B (also superimposed on FIG. 12 for purposes of illustration) that is located, for example, 8 pels above and 7 pels to the left of the macroblock $S_B$ to be reconstructed. The reconstructed data is produced by interpolation of the data retrieved from the two squares 90 and 98. To retrieve the data to be copied from the reference picture in buffer 73A, the memory controller of component 50 will address the 17×20 pel rectangle 92 of data originating at base address 91 of buffer 73A. To retrieve the data to be copied from the reference picture in buffer 73B, the memory controller of component 50 will address the 17×20 pel rectangle 95 of data originating at base address 96 the buffer 73B in the DRAM 42. After half pel interpolation is performed by the video decoder 56 on the retrieved data, the 16×16 pel macroblock of data $S_B$ is reconstructed by interpolation between the two retrieved reference rectangles 92 and 95 and written to buffer 78A at address 97 relative to the base address of the buffer 78A. Since the B-picture to be reconstructed is a field picture, only alternate odd or even lines of the rectangles 92 and 95 are retrieved. The memory controller of component 50 is able to address rectangles of data from either alternate odd or even lines only. In the writing process for a macroblock of field data, only eight corresponding odd or even lines are written to buffer 78. The retrieval operation of rectangles 92 and 95 from buffers 73A and 73B each involve retrieval from three memory pages, while the write operation of macroblock $S_B$ to buffer 78A involves a writing to only one page. With pages of the size and configuration provided by the preferred memory of the present invention, no macroblock of data in either the reference frame buffer 73 or in the field buffer 78 extends onto more than one page.

The page crossing reduction is realized to an even greater degree with the retrieval of the corresponding 4:2:0 chrominance data. As FIG. 12A demonstrates, a rectangle of 4:2:0 chrominance data has one half the vertical height, or occupies one half the number of rows, as does the luminance data. Thus, the need for the motion compensation section 77 to divide the retrieval request to two instructions to the memory controller of component 50 in order to avoid the crossing of a horizontal boundary 87 between vertically adjacent macroblocks is even less likely to occur.

Further memory addressing and page crossing advantages are realized in connection with the post-filtering and output functions, where full picture width rows of data for a single or for two adjacent or alternate scan lines are retrieved from buffers 73 or 78 for post-filtering and display. The post-filtering operation includes the interpolation of data to change the aspect ratio of a picture when the received images have a different aspect ratio than the display, and to convert the chrominance format into three color signals per pixel for display. With the memory map of the described embodiment of the invention, all data of a given scan line of a picture are stored in a continuous sequence on the same row of the memory 42, and are accordingly addressable with a single addressing step by the memory controller of component 50, subject only to the maximum size of data request that the controller of component 50 is able to handle. This maximum size is, for example, 88 bytes 76, which is 22 columns 81. Similarly, two adjacent lines of a frame or field are stored on adjacent rows of memory, up to the 16 row width of the memory. Thus, in the frame buffers 73A,73B the 16 rows of pel data for a horizontal row of adjacent macroblocks are stored in 16 continuous rows in memory. In the field buffers 78A,78B, the odd or even rows of two vertically adjacent rows of macroblocks are stored in 16 continuous rows of memory.

With the invention, one instruction to the memory controller of component 50 for the output of a scan line of the screen is all that is required for the memory controller of component 50 to issue separate read addresses, each incremented by 80h. When a single scan line is read for post-filtering, a data request is made by the memory controller of component 50 for 22 adjacent 32-bit (4-byte) wide elements of data from a single row 74. The memory controller of component 50 handles this request and reads data in a stream from the same row 74 across boundaries 86 and from three or four horizontally adjacent pages of memory, so that the post-filtering section 79 can process four bytes of horizontally adjacent pixel values on a first-in first-out basis. More than on row, for example two rows, can be read in a 44 byte wide and two byte (row) high rectangle. Such multiple rows are read column by column, in zig-zag fashion, returning first 32-bits (4-bytes) from one row, then the four vertically adjacent bytes from the same column 81 in the next row of the frame or field being read, then two sets of four bytes from the same two rows of the next column to the right, across boundaries 86 and from two or three horizontally adjacent pages 75. Crossings of boundaries 87 between vertically adjacent pages would occur only where the post-filtering section 79 of the video decoder 56 were to request data from multiple rows than lie on opposite sides of such a boundary, which can be controlled or avoided by the logic of the post-filtering section 79.

The above description of FIG. 12 has, for simplicity, assumed only a single portion of the respective buffers containing either the luminance or chrominance data. The reading and writing operations and memory addressing discussed is duplicated for both portions of the buffers, that is, for each the luminance and chrominance data. The chrominance macroblocks are the same size as the luminance macroblocks for 4:2:2 chrominance format but are ½ and twice the size of the luminance macroblocks for 4:2:0 and 4:4:4 formats, respectively, which affects the number of page crossings when the chrominance data is addressed. FIG. 12A is a representation of 4:2:0 chrominance motion compensation memory addressing for frame picture storage in buffers 73.

Figure 7A:
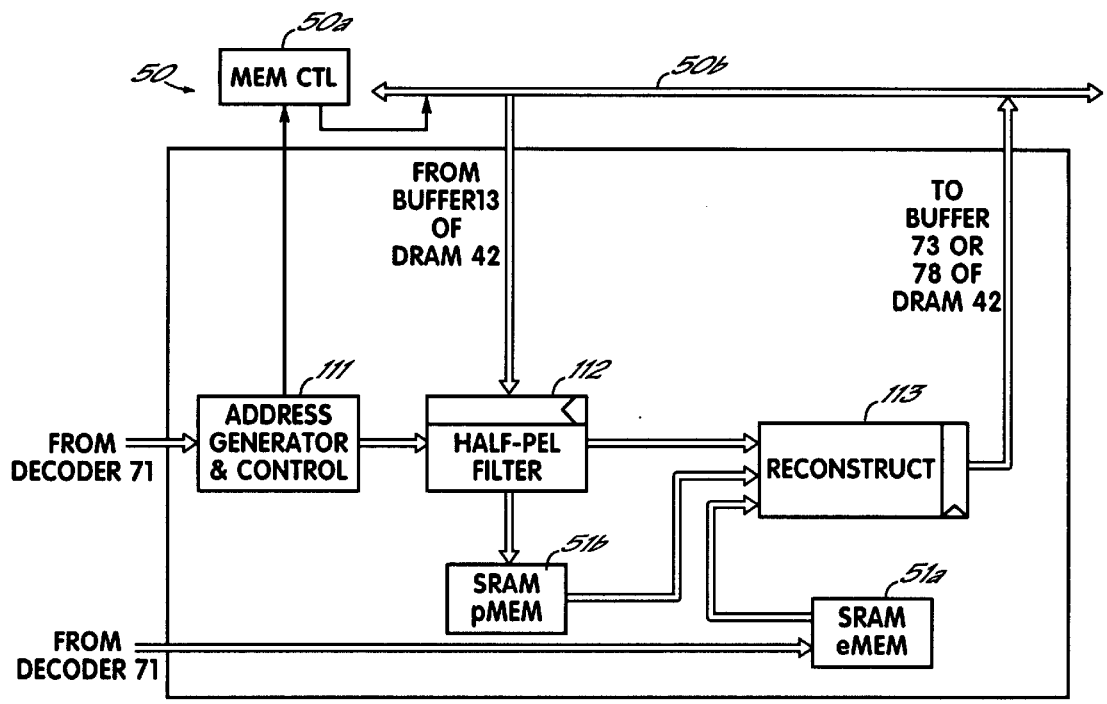
FIG. 7A is a detailed diagram representing the motion compensation section of the video decoder portion of the receiver of FIG. 7.

The generation of addresses for retrieving macroblocks S of data from the I and P frame data in the buffers 73A and 73B is carried out in the first instance by the motion compensation section 77 of the video decoder 56, the logic blocks of which are illustrated in FIG. 7A. Referring to FIGS. 7 and 7A, when a frame of data is received at 32 by the DMUX 53, the data passes through the data bus of the bus and memory controller 50 and, under control of memory controller 50a thereof. After various headers are processed, the flow of frame data ultimately involves the transmission of data for series of macroblocks, each of which contains a macroblock header and either a stream of compressed and transformed pixel data or a motion vector specifying the relative location on the screen from which data is to be copied, extrapolated or interpolated from one or two frames of data in I or P pictures stored in one or both of the buffers 73A,73B.

When the picture is an I picture, the data is all pixel data, which is decompressed and transformed by the decoder portion 71 of the video decoder 56 and passed through the motion compensation section 77 through the bus 50b to one of the buffers 73A or 73B where the macroblocks thereof are stored at their appropriate locations as part of a full frame picture. When the picture is a P or B picture, the macroblock data can be either pixel data or motion compensation vector data indicating that the pixel data for the macroblock is to be copied from a macroblock sized square of a reference picture stored in one or both of the buffers 73A,73B. If a macroblock of data received for the P or B-picture is new pixel data, the new data is stored. For P pictures, the data is stored in the appropriate macroblock location in a frame 73A or 73B of the reference buffer 73. For B-pictures, the data is stored in the appropriate field portion 78A or 78B of the output picture buffer 78.

If, for either a P-picture or a B picture, a motion vector appears in the data, the decoder logic 71 removes the motion vector data from the stream and passes it to an address generator and control block 111 of the motion compensation logic 77. If the motion vector is, for example, the motion vector 88 of FIG. 12, the block to be copied will be the block 90, requiring the reading from a frame buffer of buffer 73 the rectangle of data 92, which lies on three separate pages 75 of memory, pages $75_{47}$, $75_{69}$ and $75_{70}$. Because this rectangle 92 is divided by a horizontal page boundary 87, the address generator 111 of the motion compensation logic 77 generates two data requests, one for the upper portion of the rectangle 92 that lies on page $75_{47}$, and one for the lower portion of the rectangle 92 that lies on pages $75_{69}$ and $75_{70}$. These requests are sent one at a time to the memory controller portion of the memory controller and bus 50. The memory controller 50a will generate a single request for a rectangle of data for the upper rectangle which lies entirely on page $75_{47}$. When the upper rectangle of data has been retrieved and processed, the memory controller 50a will generate two requests for separate rectangles of data for the lower portion of the rectangle 92, one request for the rectangle that lies on page $75_{69}$ and one request for the rectangle that lies on page $75_{70}$.

In response to the individual requests, macroblocks of data are returned from the buffer 73 in DRAM 42 via the bus of 50b to a half-pel filter section 112 of the motion compensation logic 77 where, along with motion vector information from the address generator 111, the half-pel interpolation, if required in either the horizontal or vertical direction, is carried out. The data from the filters 112 is then sent to a reconstruction section 113 where extrapolation or interpolation from the macroblock pixel data of one or two frames is carried out. Data of macroblocks from the input stream 32 or from DRAM 42 are respectively stored in the SRAM 51, two of the distributed portions of which are designated eMEM 51a and pMEM 51b in FIG. 7A, as explained in more detail below.

The motion compensation unit 77 applies motion compensation to macroblocks copied from the reference pictures in the reference picture buffers 73A and 73B, collects coefficients or motion vectors from the Transform Unit 71, and generates reconstructed picture from the motion vectors and copied macroblocks according to the MPEG-2 standards. The motion compensation unit 77 maintains interfaces with the memory controller and data bus 50b so that the motion compensation unit 77 can read in the reference picture data from the DRAM 42 and store the reconstructed data into the memory 42

The general responsibilities of the motion compensation unit 77 include generating address and data block size requests for macroblocks of the reference picture data in buffers 73A,73B and placing data transfer requests to the memory controller 50b. The motion compensation unit 77 also runs retrieved reference data through horizontal and vertical prediction filters. Predicted data is stored in portions of the SRAM 51 that are distributed in this unit. The unit 77 further supports half pel interpolation, that is, motion vectors having horizontal or vertical components that can take values at increments of one half pel. The unit 77 is responsible for reconstructing picture data from the half pel prediction values and the from the motion vector coefficient values supplied by the decoder 71.

The motion compensation unit 77 depends on the decoder unit 71 for the motion vectors and the address of the reference block, and for the inverse-transformed coefficient. It depends on the memory controller unit 50b for data transfers.

The address generation unit 111 accepts the motion vectors from the decoder 71 and calculates the starting address of the reference macroblock in the reference picture buffer 73. The address generation unit 11 issues OMta transfer requests to the memory cor troller unit 50 In response to requests, data transfer from DRAM 42 occurs in 64 bit (8 byte) chunks at addresses aligned at 8-byte boundaries. When data returns from DRAM 42, they are latched in the motion compensation unit 77. Each 8 bit element of these latched data is then run through horizontal and vertical filters, and the filtered data is stored in array in SRAM 51. Since the starting address of the reference block may not be aligned at the 8-byte aligned address, multiplexing is required at the input of the SRAM array.

For I-pictures, prediction is not required, and when an I-picture is received and passed through the motion compensation unit 77, the motion compensation hardware sits idle. For both P and B-pictures, prediction data is required for reconstruction of the picture. In cases of B-pictures, the predicted data is obtained by averaging two such predictions, one being the output of the half-pel at the time and the other being a value out of the pMEM portion of SRAM 51b. that was stored after a forward prediction. The reconstruction hardware 113 supports this averaging function of half-pel filters 112.

The other SRAM array 51a, designated eMEM, holds coefficient data transformed in the decoder 71. Reconstruction of the picture starts once eMEM is full. The motion compensation unit 77, at such a time, issues a data transfer request and starts the reconstruction. The reconstruction basically involves adding signed numbers from the decoder output that are stored in eMEM 51a to the half pel filter outputs stored in pMEM 51b for non-intra blocks, or blocks of B or P-pictures. For intra blocks or blocks of I-pictures, however, the addition is not required. The adder output is clipped before it is latched at the output of the reconstruction unit 113 when the hardware is used to reconstruct the picture. The calculations made to determine the addresses and the number of bytes for a data request are set forth in FIG. 13, with the interface signals for interfacing of the motion compensation section 77 with other units being as set forth in the following table, Table 1:

TABLE 1

| NAME | WIDTH | TYPE (I/O) | DESCRIPTION |
| --- | --- | --- | --- |
| gresetn | 1 | INPUT | GLOBAL RESET SIGNAL |
| ghaltn | 1 | INPUT | GLOBAL HALT |
| sclk | 1 | INPUT | GLOBAL CLOCK |
| gbus | 64 | OUTPUT | 64 BIT GLOBAL BI-DIRECTIONAL BUS |
| mc_refblk_req | 1 | OUTPUT | REQUEST FOR REFERENCE BLOCK DATA TO THE MEMORY CONTROLLER |
| mc_mvreq | 1 | OUTPUT | REQUEST FOR MOTION VECTOR TO THE VLD |
| mc_mbax_req | 1 | OUTPUT | REQUEST FOR CURRENT MACRO-BLOCK ADDRESS X-DIMENTION TO THE VLD |
| mc_mbay_req | 1 | OUTPUT | REQUEST FOR CURRENT MACRO-BLOCK ADDRESS Y-DIMENTION TO THE VLD |

TABLE 1-continued

| NAME | WIDTH | TYPE (I/O) | DESCRIPTION |
| --- | --- | --- | --- |
| vld_my_fifo_empty | 1 | INPUT | MOTION VECTOR FIFO IN VLD IS EMPTY - AN INACTIVE LEVEL VALIDATES THE MOTION VECTOR ON THE BUS |
| vld_my | 1 | INPUT | MOTION VECTOR DATA FROM THE VLD |
| vld_mbs | 1 | INPUT | MACROBLOCKS START SIGNAL FROM THE VLD |
| vld_intra | 1 | INPUT | VLD INDICATING THAT THE DATA IS DECODING IS FROM AN I-CODED PICTURE |
| vld_pic_b | 1 | INPUT | AN ACTIVE LEVEL ON THIS SIGNAL INDICATES A B-CODED PICTURE DATA IN THE VLD PIPELINE |
| vld_mv | 12 | INPUT | 12 BIT BUS OVER WHICH MOTION VECTORS AS WELL AS THE MACROBLOCKS ADDRESS IS TRANSFERRED FROM THE VLD TO THE MC |
| vld_emem_full | 1 | OUTPUT | MOTION COMPENSATION UNIT ASSERTS THIS SIGNAL TO STALL THE COEFFICIENT DATA FLOW FROM THE IT AFTER 1/2(?) BLOCK TRANSFER |
| it_bs | 1 | INPUT | START OF A BLOCK DATA FROM THE INVERSE TRANSFORM |
| it_coeff_dat | 9 | INPUT | CO-EFFICIENT DATA FROM THE INVERSE TRANSFORM |

Figure 14:
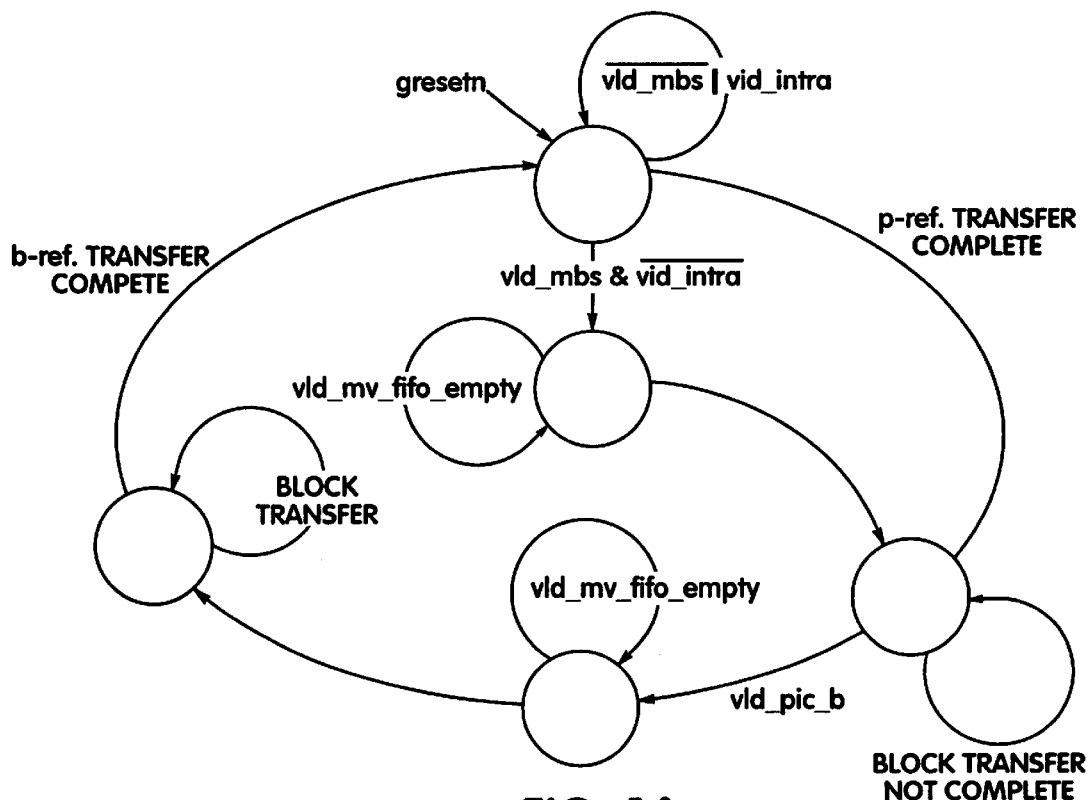
FIG. 14 is a state diagram used by a portion of the logic of the motion compensation section of FIG. 7A.

The functionality view for the transfer of reference picture data from buffers 73A,73B of DRAM 42 is set forth in FIG. 14. In particular, as the state transitions diagram depicts, vld-mbs is an indication of the start of a macroblock processing. At this time, vld-intra is sampled to check to see if motion compensation is required for the macroblock. For coded pictures that require motion compensated reference calculation, the state machine waits until a decoder unit 71 motion vector FIFO is not empty. This control hardware of the address generation unit 111, then generates a request for a motion vector by making two consecutive requests for X and Y components of the motion vectors. Once the hardware has both components of a motion vector, the address of the reference block is calculated. The address generation unit 111 then places a request for data transfer to the memory controller unit 50.

B coded pictures are indicated by an active vid_pic_b. For these, another set of components for motion vectors is requested from the decoder unit 71. These are used in a similar way as the first one of vector components to generate the address for the other reference.

Figure 15:
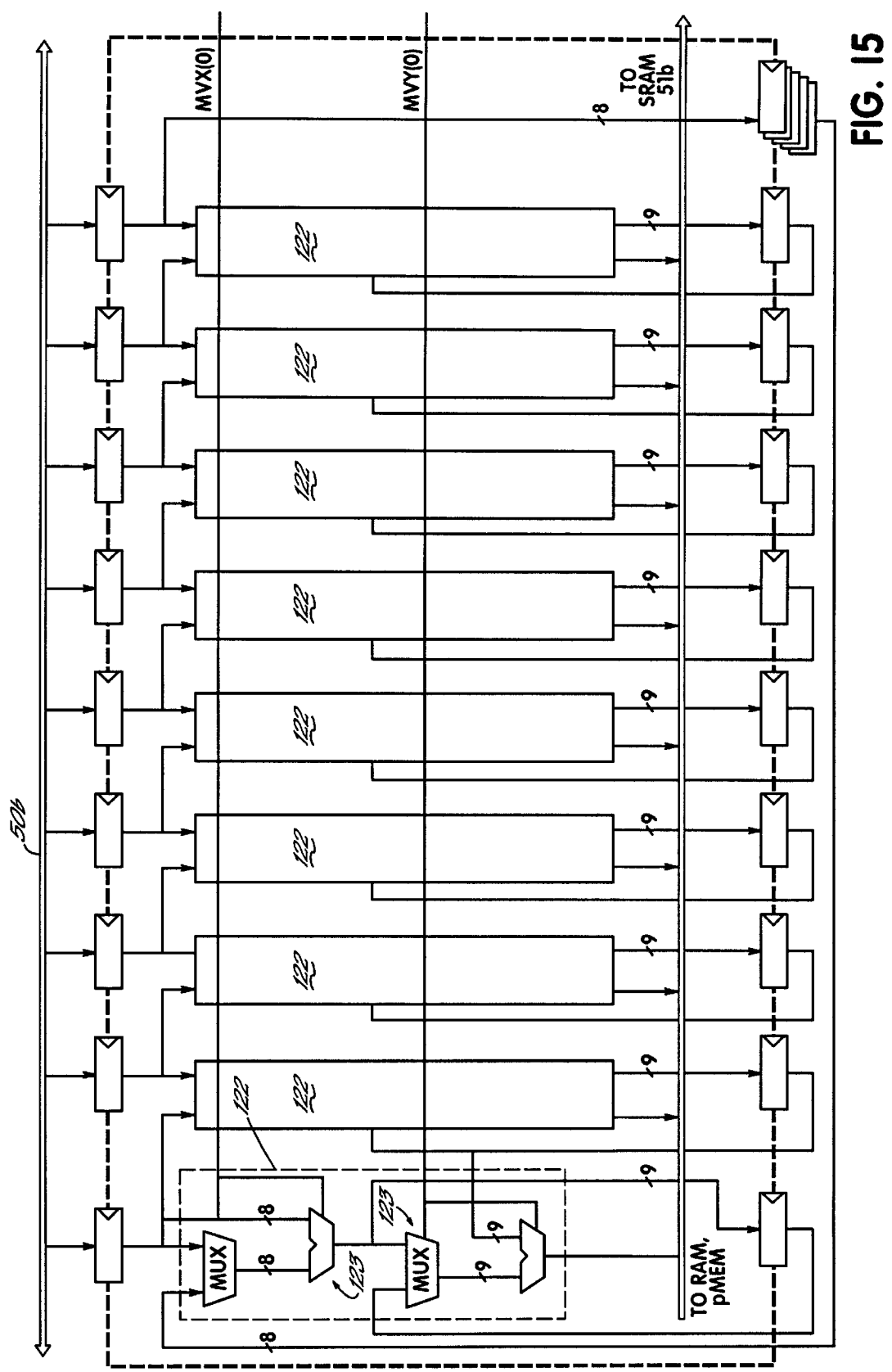
FIG. 15 is a block diagram of the prediction filter portion of the motion compensation section of FIG. 7A.

In response to the request for reference block data to the memory controller 50a, the memory controller 50a fetches continuous sequences of 64-bit data from 8-byte aligned DRAM addresses, and sends them to the motion compensation unit 77 over the 64-bit bus of data bus 50b, as illustrated in FIG. 15. At the input of the prediction hardware 112, these 64 bits are latched in latches 121 as eight 8-bit elements. These elements pass through both horizontal and vertical filters 122 before being stored in the pMEM or SRAM array 51b. The filters 122 pass through the input element, or an average of two adjacent elements expressed as an 8-bit quantity. The top half 123 of the logic in FIG. 15 is used for elements adjacent horizontally, while the bottom half 124 is used for elements adjacent vertically. In both cases, the least significant bit of the motion vector component determines if half-pel prediction in that particular direction is required.

Since a macroblock of data is treated eight elements at a time, the rightmost element of the previous 64-bit data is saved to supply the left adjacent element for the next set. However the leftmost column of the screen does not have left adjacent elements, so in that situation the data is passed through and ignored while storing in the SRAM 51a.

The algorithm for reconstruction performed in the reconstruction logic 113 is basically an addition in adder logic 131 of the co-efficient calculated in the Inverse Transform (IT) portion of decoder unit 71 to the predicted reference data. This result is clipped by clipper logic 132 to represent an 8-bit positive quantity. Thus, the adder adds numbers form the eMEM 51a, holding the coefficient function, and pMEM 51b, holding the predicted picture data. I-coded pictures do not require motion compensation, so one input to the adder is forced to zero in case of I-pictures. This same set of adders 131 is used to combine forward and backward prediction in the case of B-coded pictures. Output of the half-pel filters 112 is multiplexed at the input of the adder 131 instead of the eMEM 51a output. The result is shifted right by one bit. This gives a bidirectional prediction. The result is stored back in the RAM 51.

Figure 15A:
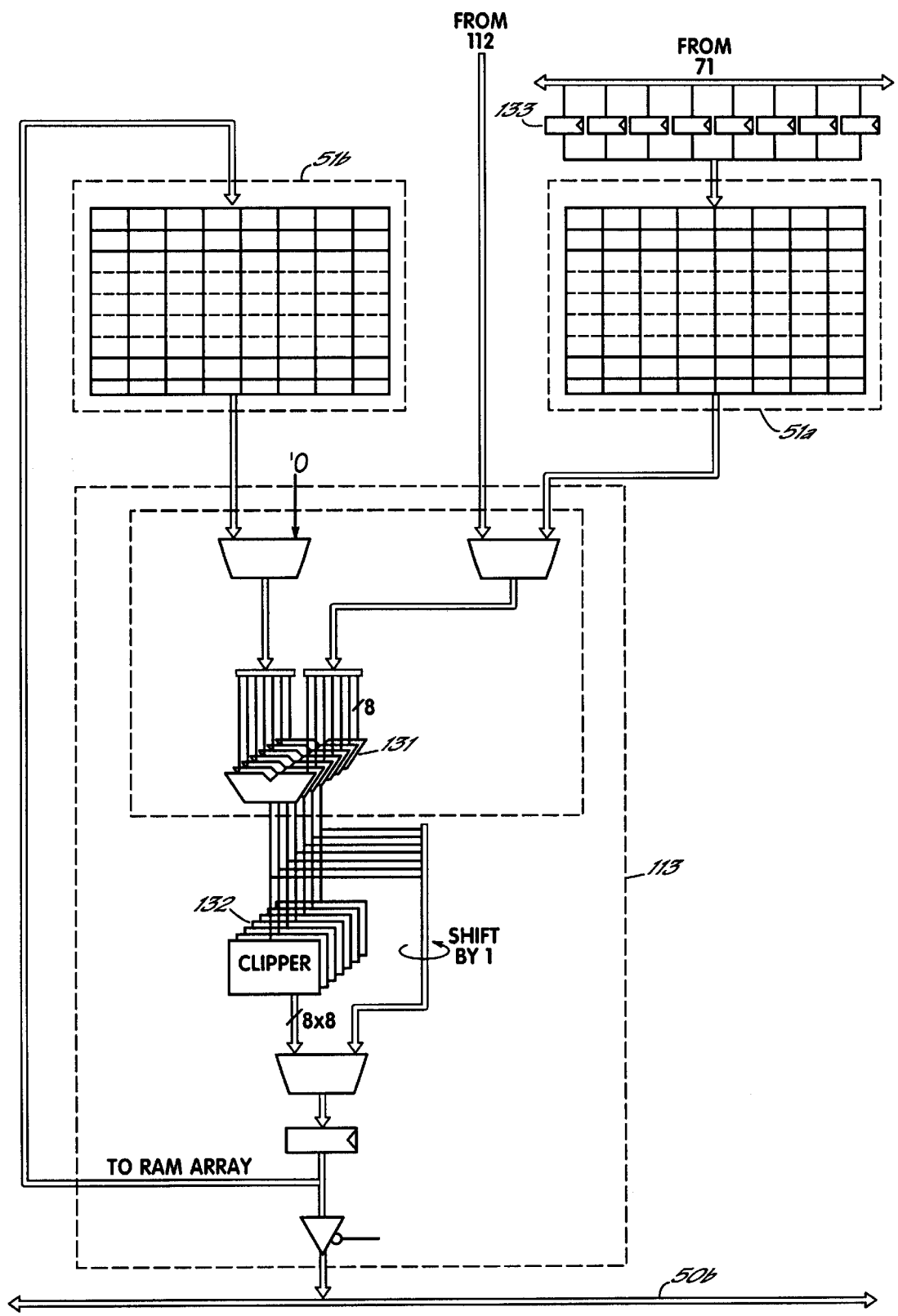
FIG. 15A is a block diagram of the reconstruction portion of the motion compensation section of FIG. 7A.

Further referring to FIG. 15A, the transform portion of the decoder 71 activates it_bs to mark the beginning of a 64×9 block of data. After activating it_bs, the decoder 71 sends streams, at a rate of one per clock cycle, of 9-bit coefficients. Eight of these are collected in latches 133 before all of them are stored in the eMEM 51a of SRAM 51. The eMEM 51a is only equipped with storage for one macroblock, for example, six blocks. Any possibility of overflow will generate a back propagating stall to the transform portion of the decoder 71, so that they are preserved in earlier stages of the pipeline.

Applying the description of the memory map and address methodology set forth above, the addresses of each column 81 of each row 74 of the first page 75-1 of the DRAM buffer 42 is set forth in FIGS. 18-12A. Each such page 75 stores 16 rows of 32 bytes each, and is thereby two macroblocks wide and one to four macroblocks high, depending on the luminance or chrominance format of the data and whether the picture is frame or field, as explained in connection with FIGS. 8–11B above. The first page 75-1 is shown with a base address (upper left corner pixel) of 000000h, where the next page 75-2 is shown with a base address of 000200h. As illustrated, in the preferred embodiment, the memory addresses wrap form row 74 to row 74 after each 8 bytes (two columns) along a row. When the 16th row 74-16 is reached, the addresses jump to the first row 74-1 8 bytes (two columns) to the right. In this manner, the reading of data across the same row 74 involves the reading of 64 bits (8 bytes or two columns) followed by the incrementing of the address by 80h and the reading of 64 more bits of data.

Figure 16:
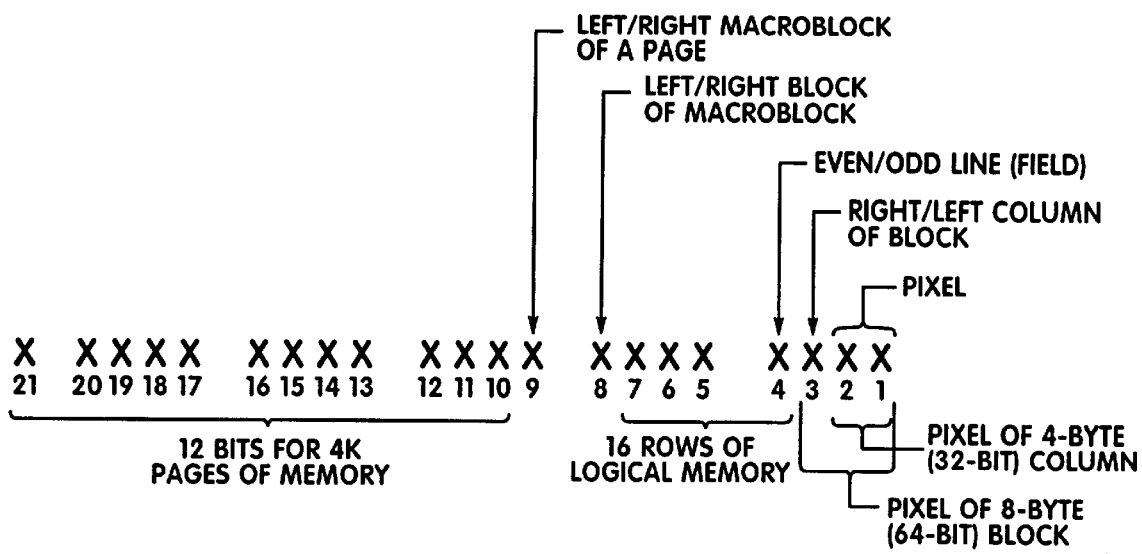
FIG. 16 is a example of an address structure for addressing a byte or relative base address of data in the memory illustrated in FIGS. 8–12A.

FIG. 16 shows how a 21-bit word can address the bytes of storage of a 16-Mbit (2 MByte) DRAM 42, illustrated for the case where the base address is at the upper left corner of the picture. The two rightmost bits can specify one of the four bytes of a 32-bit column 81 of a line 74. These bits are not needed to address a 32-bit wide block of data. The third bit specifies the right or left column 81 of an 8×8 block. This bit is not needed to address a 64-bit wide block of data, which would be equivalent to one line of an 8×8 block. In the preferred embodiment of the invention, the addresses wrap after each 8 byte line segment of the picture to store 16 such lines in consecutive locations of the memory 42, or two 8×8 blocks stored consecutively line by line. This 8-byte line could be of a different size, for example, a 16 byte or pixel line, wrapping line by line, for example for a full macroblock of luminance data or two vertical macroblocks of 4:2:0 chrominance data. In this case, the 4th bit from the right would designate the left or right block of a macroblock.

The next four rightmost bits specify the one of the 16 rows 74 of the logical memory. the In the preferred embodiment, these are the 4th through 7th bits. The 4th bit specifies whether the row is even or odd, and can fixed to selectively address data from one field only when, for example, reading from an interleaved full frame buffer 73. The 8th bit specifies the left or right 8×8 pel block of a macroblock. Incrementing this bit while fixing the three bits 4–7 moves the address along the same line 74. Incrementing the 8th bit and the bits to its left effectively scans to the right across a line of the picture. The 9th bit will specify the left or right macroblock of a horizontally adjacent macroblock pair that would occupy the length of one page 512 byte page 75 of memory. Thus, the 1st through 9th rightmost bits can be used by the memory controller 50a to formulate the addressing of data stored on the same page 75 of memory, such as for reading or writing rectangular blocks of data residing on a single memory page.

The next bits, bits 10–21, can be used to specify pages of memory. The memory controller 50a can increment the right ones of these bits move across adjacent pages to scan across a horizontal picture line. The motion compensation section 77 can add to these bits to move vertically down the screen. The 9th bit would also be of interest to the motion compensation logic 77 to keep vertical alignment of the macroblocks when the number of macroblocks that extend across a picture width is odd, as in the case of the embodiment illustrated in FIGS. 12 and 12A. One of the bits 10–21 can be used for bank switching. For example, if the 10th bit designates one of two alternate banks of the memory 42, consecutive pages can be alternately stored in alternating banks of the memory 42.

The ability to address rectangular blocks of data and to break up the memory access requests between the memory controller 50a and the motion compensation logic 77, or to scan individual lines of data across a screen, with simple fixed increment addition to the address is an advantage of the memory configuration described above.

Those skilled in the art will appreciate that the applications of the present invention herein are varied, and that the invention is described in preferred embodiments. Accordingly, additions and modifications can be made without departing from the principles of the invention.

What is claimed is:

1. An integrated circuit that includes a video decoder having a motion compensation circuit for constructing a current picture based upon a motion vector in an input video stream by copying data to a portion of the current picture from a portion of a reference picture by relocating the copied data in the current picture by the value of the motion vector, comprising:

a memory controller for controlling a multi-page memory arranged in logical rows and columns of memory locations, at least a portion of the memory locations collectively holding reference pictures, wherein the reference pictures include a plurality of reference blocks of data stored in a plurality of logical rows of pages of the memory such that the stored data that are horizontally contiguous across any rectangular area of the reference picture lies in the same logical row of logically adjacent pages;

decoding circuitry operable to extract the motion vector from the input video stream;

a motion compensation circuit operable, in response to the extracted motion vector, to identify a contiguous rectangular portion of a reference picture containing at least one sub-portion each occupying a contiguous rectangular area thereof and to generate a signal for reading said portion of the reference picture from the memory by communicating a separate memory request to the memory controller for each such logical row of pages on which each sub-portion of said portion of the reference picture is stored, and by communicating a plurality of such separate memory requests to the memory controller when said portion of the reference picture includes a plurality of such sub-portions, each request including data from only a single logical row of logically adjacent pages of the memory;

the memory controller being operable to retrieve the horizontally contiguous data of said any rectangular area from a plurality of logically adjacent pages in one logical row thereof in response to one of said separate memory requests from the motion compensation circuit; and whereby the integrated circuit is operable to read each sub-portion of said portion of the reference picture from the memory, one in response to each memory request.

2. An integrated circuit that includes a video decoder having a motion compensation circuit for constructing a current picture based upon a motion vector in an input video stream by copying data to a portion of the current picture from a portion of a reference picture by relocating the copied data in the current picture by the value of the motion vector, comprising:

a decoder programmed to decode a motion vector and derive therefrom the location of a rectangular array of digital picture data stored in a buffer memory that is configured of a plurality of pages;

a memory controller operable to read or write data to or from a plurality pages, in response to a single address command, when the pages of the plurality are logically consecutive;

an address generator operable to address the rectangular array of digital picture data at said location in the buffer memory, the address generator being programmed:

to determine if the rectangular array of data crosses a page boundary that results in the array lying in a logically non-consecutive pages of the memory, and if so to identify each of the portions of the data that lie on logically consecutive pages;

to generate a separate address command for each identified portion of the data lying in different consecutive pages of the memory;

the memory controller being operable, in response to each separate addressing of a portion of the array in the memory, to determine if each respective addressed rectangular portion of the array lies on a plurality of different pages of the consecutive pages of the memory, and if so, to respectively read or write such data to or from each different one of the consecutive pages of the of the memory.

3. The integrated circuit of claim 1 wherein:

the reference pictures include a plurality of horizontal scan lines of picture data each stored in a logical row of the memory locations across a plurality of the pages of a logical row of pages of the memory.

4. The integrated circuit of claim 1 wherein:

the motion compensation circuit is operable to generate said signal containing information of the location in the memory and size of the portion of the reference picture to be copied.

5. The integrated circuit of claim 1 wherein:

the motion compensation circuit is operable to generate said signal containing information of an origin defining a location in the memory of the portion of the reference picture to be copied and of the number of rows and columns defining rectangular dimensions of the portion of the reference picture to be copied.

\* \* \* \* \*